United States Patent
Cao et al.

(10) Patent No.: US 7,162,632 B2
(45) Date of Patent: Jan. 9, 2007

(54) EFFICIENT OPTICAL NETWORK DESIGN USING MULTI-GRANULAR OPTICAL CROSS-CONNECTS WITH WAVELENGTH BAND SWITCHING

(75) Inventors: Xiaojun Cao, Lockport, NY (US); Chunming Qiao, Williamsville, NY (US); Vishal Anand, Buffalo, NY (US); Yizhi Xiong, West Hollywood, CA (US)

(73) Assignee: The Research Foundation of SUNY, Amherst, NY (US)

( * ) Notice: Subject to any disclaimer, the term of this patent is extended or adjusted under 35 U.S.C. 154(b) by 662 days.

(21) Appl. No.: 10/665,535

(22) Filed: Sep. 19, 2003

(65) Prior Publication Data

US 2004/0153492 A1  Aug. 5, 2004

Related U.S. Application Data

(60) Provisional application No. 60/412,611, filed on Sep. 20, 2002.

(51) Int. Cl.
*G06F 1/24* (2006.01)
(52) U.S. Cl. ........................ 713/163; 713/168; 713/153
(58) Field of Classification Search ................ 713/163, 713/168, 153
See application file for complete search history.

(56) References Cited

OTHER PUBLICATIONS

Shiragaki, T. et al. "Optimum Protection Architecture for Reliable Dense-WDM Lightwave Networks", Communications, 1998. ICC 98. Conference Record. 1998 IEEE International Conference at Atlanta, GA, USA Jun. 7-11, 1998, New York, NY, USA IEEE, US Jun. 7, 1998, pp. 181-186.

O. Gerstel, R. Ramaswami, and W. Wang, "Making use of a two stage multiplexing scheme in a WDM network," in *Proceedings—OFC*, 2000, pp. ThD1-3.

J. Paul Faure et al., "A scalable transparent waveband-based optical metropolitan network," in *ECOC, post-deadline*, 2001.

R. Lingampalli and P. Vengaiam, "Effect of wavelength and waveband grooming on all-optical networks with single layer photonic switching," *Proceeedings—OFC*, 2002, p. ThP4.

L. Noirie, C. Blaizot, and E. Dotaro, "Multi-granularity optical cross-connect," in *ECOC*, 2000.

L. Noirie, M. Vigoureux, and E. Dotaro, "Impact of intermediate grouping on the dimensioning of multi-granularity optical networks," in *Proceedings—OFC*, 2001, pp. TuG3-3.

K. Harada, K. Shimizu, T. Kudou, and T. Ozeki, "Heirarchical optical path cross-connect systems for large scale WDM networks," in *Proceedings—OFC*, 1999, pp. WM55-3.

M. Lee, J. Yu, Y. Kim, C. Kang, and J. Park, "Design of heirarchical crossconnect WDM networks employing a two-stage multiplexing scheme of waveband and wavelength," in *IEEE JSAC*, vol. 20, No. 1, pp. 166-171, Jan. 2002.

R. Izmailov, S. Ganguly, Y. Suemura, I. Nishioka, Y. Maeno, and S. Araki, Waveband routing in optical networks, in *IEEE International Conference on Communications (ICC '02)*, New York, 2002.

*Primary Examiner*—Thomas R. Peeso
(74) *Attorney, Agent, or Firm*—Simpson & Simpson, PLLC

(57) ABSTRACT

A method for managing static data traffic of at least one light path in an optical network, comprising the steps of achieving load balanced path routing for the at least one light path, assigning wavelengths to demands of the at least one light path, and, switching the at least one light path according to its assigned wavelength. A method for managing dynamic data traffic of at least one light path in an optical network, comprising the steps of routing the K-shortest path, which has the largest interference length (L), and, assigning waveband with a First-Fit network topology based on band/port number restriction and minimum weight.

56 Claims, 14 Drawing Sheets

$$W_{sd} = \sum_{p \in Q'_s} h_p \times t_p = 4 \times 1 + 3 \times 1 + 2 \times 1 + 3 \times 1 + 2 \times 1 + 2 \times 1 = 16$$

EFFICIENT OPTICAL NETWORK DESIGN USING MULTI-GRANULAR OPTICAL CROSS-CONNECTS WITH WAVELENGTH BAND SWITCHING

CROSS-REFERENCE TO RELATED APPLICATION

This patent claims the benefit under 35 U.S.C. §119(e) of U.S. Provisional Application No. 60/412,611, filed Sep. 20, 2002, which application is incorporated herein by reference.

FIELD OF THE INVENTION

This invention relates generally to networks and network architectures, more particularly to optical networks, and, even more particularly, to an efficient optical network design using multi-granular optical cross-connects with wavelength band switching (WBS).

BACKGROUND OF THE INVENTION

Optical networks using dense wavelength-division multiplexing (DWDM) technology is a key solution to keep up with the tremendous growth in data traffic demand. However, as WDM transmission technology matures, the ability to manage traffic (including switched and protected traffic) in a WDM network is becoming increasingly critical and complicated. In particular, the rapid advances in dense WDM technology (with hundreds of wavelengths per fiber) and world-wide fiber deployment have brought about a tremendous increase in the size (i.e., number of ports) of optical cross-connects (OXCs), as well as the cost and difficulty associated with controlling such large OXCs. In fact, despite the remarkable technological advances in building photonic cross-connect systems and associated switch fabrics, the high cost (both capital and operating expenditures) and unproven reliability of huge switches (e.g., with 1000 ports or more) have not justified their deployment.

Waveband Switching (WBS) in conjunction with multi-granular OXC (MG-OXC) architectures has been proposed to support the ever-increasing traffic while maintaining the cost and complexity of the system at a reasonable level. The main idea of WBS is to group several wavelengths together as a band, and switch the band as a single entity (i.e., using a single port) whenever possible (that is a band is demultiplexed into individual wavelengths if and only if necessary, e.g., when the band carries at least one lightpath which needs to be dropped or added). A complementary hardware is MG-OXC that not only can switch traffic at multiple levels such as fiber, wavelength band (or waveband), and individual wavelength (or even sub-wavelength), but also can add and drop traffic at multiple levels, as well as multiplex and demultiplex traffic from one level to another within an MG-OXC itself. By using WBS in conjunction with MG-OXCs, the total number of ports required in such network (to be called a WBS network hereafter) to support a given amount of traffic can be much lower than that in a traditional wavelength routed network (WRN) that uses ordinary OXCs (that switch traffic only at the wavelength level). The reason is that 60–80% of traffic simply bypasses the nodes, and hence the wavelengths carrying such transit traffic do not need to be individually switched in WBS networks (as opposed to WRNs wherein every such wavelength still has to be switched using a single port).

In addition to reducing the port count (which is a major factor contributing to the overall cost of switching fabrics), the use of bands reduces the number of entities that have to be managed in the system, and enables hierarchical and independent management of the information relevant to wavebands and wavelengths. This translates into reduced size (footprint), power consumption and simplified network management. Moreover, relatively small-scale modular switching matrices are now sufficient to construct large-capacity optical cross-connects, making the system more scalable. With WBS, some or most of the wavelength paths (or lightpaths) do not have to pass through individual wavelength filters, thus simplifying the multiplexer and demultiplexer design as well. In fact, cascading of FTB and BTW demultiplexers has been shown to be effective in reducing cross-talk, which is critically important in building large capacity backbone networks. Finally, all of these also result in reduced complexity of controlling the switch matrix, provisioning and providing protection/restoration in a similar way.

This patent describes efficient heuristic algorithms for WBS with MG-OXCs. This work considers the case of both off-line and on-line traffic. Optimal Integer Linear Programming or ILP formulations and efficient heuristic algorithms are provided for the off-line MG-OXC network design and dimensioning. For the on-line traffic, efficient heuristic algorithms are provided to reduce the used number of ports or alternately minimize the blocking to the traffic for a given number of ports. The work also provides methodologies for efficient protection and restoration with wavelength and waveband conversion in MG-OXC networks. This technology can be applied to consider various survivability schemes with SRLG and also to networks with limited or no wavelength conversion capabilities. In addition, the technology can also be applied to hybrid optical networks, i.e., networks consisting of a mix of both ordinary OXC and MG-OXCs. A new cost effective MG-OXC architecture and cost model is also provided.

Other Solutions

In this section we review some of the existing work on MG-OXC and WBS. So far, only very limited research has been done on MG-OXC and WBS. The concept of WBS was researched in rings and on MG-OXCs in mesh networks, a couple of IETF drafts on Generalized Multi-protocol Label Switching (G-MPLS) control plan extension to WBS networks, and one journal paper on WBS algorithms.

The other research discusses how optical bypass can be efficiently realized using wavelength bands in rings (LANs or MANs). The feasibility and cascadability of MG-OXCs in rings were investigated either via computer simulation or prototyping. Limited analytic work for some special traffic patterns in rings is done. However, none of these works addressed WBS in networks with the mesh topology (useful for the WANs). Others have suggested a two-layer switching fabric containing a band cross-connect (BXC) and a wavelength cross-connect (WXC). Others added a new switching layer, i.e., a fiber cross-connect (FXC) (but without wavelength conversion or waveband conversion capabilities), still others have proposed a single layer MG-OXC (which also does not include wavelength conversion or waveband conversion). In addition, a waveband OXC structure with "broadcast and select" function was proposed. None of these papers offered any interesting WBS algorithms.

Wavelength Grouping for WBS

There are several wavelength grouping strategies including: (1) end-to-end grouping: grouping the traffic (lightpaths) with same source-destination (s-d) only; (2) one-end-grouping: grouping the traffic between the same source (or destination) nodes and different destination (or source) nodes; (3) sub path grouping: grouping traffic with common sub path (from any source to any destination). Note that all existing work assumes either Strategy 1 or 2. Strategy 3 as it is the most powerful (in terms of being able to maximize the benefits of WBS) although it is also the most complex to use in WBS algorithms. Others studied a two-layer MG-OXC as in assuming wavelength grouping Strategy 2 (with one-end-grouping) only (which makes it difficult to take advantage of the benefits of WBS), and full wavelength conversion.

MG-OXC Architectures

Prior research typically considered MG-OXC architectures as shown in FIGS. 1 and 2. Note that these architectures themselves are our novel extension (i.e., with wavelength and waveband conversion banks, $T_x/R_x$ and DXC components) to existing architectures. The first MG-OXC architecture includes the FXC, BXC and WXC layers. As shown in the Figures, the WXC and BXC layers consist of cross-connect(s) and multiplexer(s)/demultiplexer(s). The WXC layer includes a wavelength cross-connect (WXC) switch that is used to bypass/add/drop lightpaths at this layer, band-to-wavelength (BTW) demultiplexers, and wavelength-to-band (WTB) multiplexers. The BTW demultiplexers are used to demultiplex bands into wavelengths, while the WTB multiplexers are used to multiplex wavelengths into bands. At the BXC layer, the waveband cross-connect (BXC) is used to switch wavebands. The BXC layer also includes the fiber-to-band (FTB) demultiplexers and band-to-fiber (BTF) multiplexers. Similarly, fiber cross-connect (FXC) is used to switch fibers at the FXC layer. This architecture is dynamic in that (1) which fiber(s) and which band(s) in the fiber(s) to go through the FTB and BTW demultiplexers, respectively, can be dynamically reconfigured; and (2) some waveband(s) and some wavelength(s) can go through the waveband conversion and wavelength conversion, respectively. Clearly, this architecture is the most flexible as it allows a completely dynamic reconfiguration of the fibers, bands, and wavelengths for drop, add or bypass.

Compared to the first MG-OXC, the second one is a single-layer MG-OXC which has only one common switching fabric, as shown in FIG. 2. This switching matrix includes three logical parts corresponding to FXC, BXC and WXC, respectively. However, the major differences are the elimination of FTB/BTW demultiplexers and BTF/WTB multiplexers between different layers, which results in a simpler architecture to implement, configure and control. Another advantage of this single-layer MG-OXC is better signal quality because all lightpaths that do not require wavelength or waveband conversion go through one switching fabric (except those requiring conversion) where as in the multi-layer MG-OXCs, some of them may go through 2 to 3 switching fabrics (i.e., FXC, BXC and WXC). As a tradeoff, some incoming fibers, e.g., fiber n, are pre-configured as "designated fibers". Only designated fiber(s) can have some of its bands dropped while the remaining bands bypass the node, all other non-designated incoming fibers (e.g., fibers 1 and 2) have to have all the bands either bypass the node entirely or be dropped entirely. Similarly, within these designated fiber(s), only designated band(s) can have some of its wavelengths dropped while the remaining bands bypass the node.

Each of these architectures are either limited or otherwise extreme solutions. For example, the first one may be an overkill and hence too expensive, complicated and unnecessary, while the second may be too limited in terms of its adaptability (reconfigurability) to efficiently reduce the port count.

There has been very limited work on efficient optical network design using MG-OXC with WBS. They all represent early stage work that is neither comprehensive nor complete. In fact, many basic problems including which MG-OXC architectures should be used, and how wavelength grouping can be done efficiently in WBS networks are still open. More advanced issues such as survivability using novel waveband recovery schemes and wavelength, waveband conversion in MG-OXC networks, though important have not yet been studied.

All prior work either assumed only simple metro-area or ring networks. Accordingly, very few simple and inefficient ILP formulations and heuristics for wavelength grouping were developed for WBS. In particular most work considered restricted simple wavelength grouping techniques, such as grouping traffic from the same source(s) to same destination(s)

or trying to band or group lightpaths with the same destination(s) only. In addition, these works simplify the problem by assuming full wavelength conversion capability at all nodes, which may not be the case in reality.

Further, all prior work has considered WBS for static off-line traffic only. None of the work has considered WBS and MG-OXC architectures and design for dynamic on-line traffic.

The new challenges in designing WBS networks require innovative solutions that can only be obtained by building upon and advancing the knowledge of, and techniques for WRNs. More specifically, although a tremendous amount of work on WRNs has been carried out, and wavelength routing is still fundamental to a WBS network, the work on WBS (and MG-OXCs) in terms of the objective and techniques are quite different from all existing work on WRNs. For example, a common objective in designing (dimensioning) a WRN is to reduce the number of wavelengths required or the number of wavelength-hops used (which is a weighted sum taking into account the number of hops a wavelength path spans).

Due to possible failures of the ports and multiplexers/demultiplexers within a MG-OXC that are dedicated to wavebands, as well as possible failure of waveband converters, one or more wavelength bands in one or more fibers may be affected, but not the entire fiber or link (cable). Existing protection restoration approaches deal only with failures of individual wavelengths and fiber/link failure. Hence, new approaches and techniques to provide effective protection and restoration based on the novel concept of band-segment become interesting, so does the novel use of waveband conversion and/or wavelength conversion to recover from waveband failures.

Open Issues in WBS with MG-OXC

To summarize, (1) none of the prior work has considered the issue of survivability and (2) waveband, wavelength conversion in MG-OXC networks. All prior work assumes full wavelength conversion capability at all the nodes in the MG-OXC network. (3) Further, the topic of efficient WBS under on-line dynamic traffic conditions has not been addressed. All existing work assumes that traffic is off-line i.e., given a priori and even so only develop simple grouping algorithms for WBS. (4) So far, existing work on WBS networks has focused on minimizing the port count only. Clearly, the cost of a multi-layer MG-OXC may be more (e.g., include additional FTB demultiplexers for interconnecting FXC and BXC layers). With respect to a network, we should consider not only the cost of all nodes, but also the cost of wavelengths/fibers (including amplifiers). (5) No research has focused on how to design MG-OXCs to cut down the overall cost of the system by not only reducing the number of ports, but also decreasing/simplifying other components such as multiplexers/demultiplexers and transmitters/receivers, as well as increasing bandwidth utilization (or reducing the number of wavelengths needed).

BRIEF SUMMARY OF THE INVENTION

Wavelength Band Switching (WBS) has been widely recognized as a means to support the ever-increasing traffic while maintaining the cost and complexity of the system at a reasonable level. Both standardization documents and commercial products are incorporating WBS-aware components. However, WBS-related problems of theoretical interests have only recently attracted the attention of the research community, and some of them have not been explored fully. More specifically, the design of a MG-OXC architecture, algorithms for online/offline traffic, algorithms for utilizing wavelength/waveband conversion, and algorithms for protection/restoration in WBS networks are challenging. In this patent, we provide efficient heuristic algorithms for WBS with MG-OXCs. This invention considers the case of both off-line and on-line traffic. Optimal Integer Linear Programming or ILP formulations and efficient heuristic algorithms are provided for the off-line MG-OXC network design and dimensioning. For the on-line traffic efficient heuristic algorithms are provided to reduce the number of ports or alternately minimize the blocking to the traffic for a given number of ports. The work also provides methodologies for efficient protection and restoration with wavelength and waveband conversion in MG-OXC networks. This technology can be applied to consider various survivability schemes with SRLG and also to networks with limited or no wavelength conversion capabilities. In addition, the technology can also be applied to hybrid optical networks, i.e., networks consisting of a mix of both ordinary OXC and MG-OXCs. A new cost effective MG-OXC architecture and cost model is also provided. We now describe the architectures, theories and algorithms as well as practical techniques for efficient Optical Network design using Multi-granular Optical Cross-connects with Wavelength Band Switching.

The proposed techniques and algorithms significantly outperform existing heuristics in WRN and MG-OXC networks in terms of port count reduction, while requiring only a very small increase in the number of wavelength-hops. In order to verify the near-optimality of the heuristic algorithms, we develop ILP formulations for optimal WBS using minimum number of ports, and compare the results with those of our heuristic algorithms. The proposed algorithms can be applied to both static and dynamic traffic.

A primary object of the invention is to support ever-increasing traffic while maintaining the cost and complexity of the system at a reasonable level.

Another object of the invention is to develop and provide efficient heuristic algorithms for port reduction in WBS networks, running much faster than ILP schemes, yet achieving near optimal results.

A further object of the invention is to provide a huge reduction in port count while also achieving bandwidth efficiency.

Still another object of the invention is to provide more flexible and scalable MG-OXC architectures.

Still a further object of the invention is to provide novel survivability schemes for WBS networks with/without wavelength and waveband conversion.

These and other objects, features and advantages of the invention will become apparent to those having ordinary skill in the art upon reading the detailed description of the invention in view of the drawings and claims.

DETAILED DESCRIPTION OF THE PREFERRED EMBODIMENT

Acronyms Used
The following acronyms are used in the detailed description of the invention:
WBS: Wavelength Band Switching
WDM: Wavelength-Division Multiplex (or Multiplexed)
WRN: Wavelength-Routed Network
OXC: Optical Cross-Connects
MG-OXC: Multi-granular Optical Cross-Connects
RWA: Routing and Wavelength Assignment
WBO-RWA: Waveband Oblivious optimal RWA
ILP: Integer Linear Programming
BPHT: Balanced Path Routing with Heavy-Traffic first waveband assignment
FXC: Fiber Cross-Connect
BXC: Band Cross-Connect
WXC: Wavelength Cross-Connect
FTB: Fiber-to-Band demultiplexer
BTW: Band-to-Wavelength demultiplexer
BTF: Band-to-Fiber multiplexer
WTB: Wavelength-to-Band multiplexer
WH: Wavelength Hop
AP: Active Path
BP: Backup Path
BS: Band Segment
ABS: Active Band Segment
BBS: Backup Waveband Segment
H: Number of hops in a lightpath
L: Interference length (in number of hops) with other existing lightpaths MIWRA: Maximum Interference Waveband Routing and Assignment Technical field Data and Telecommunication Networks (subfield: Traffic Grooming)

Figure 1:
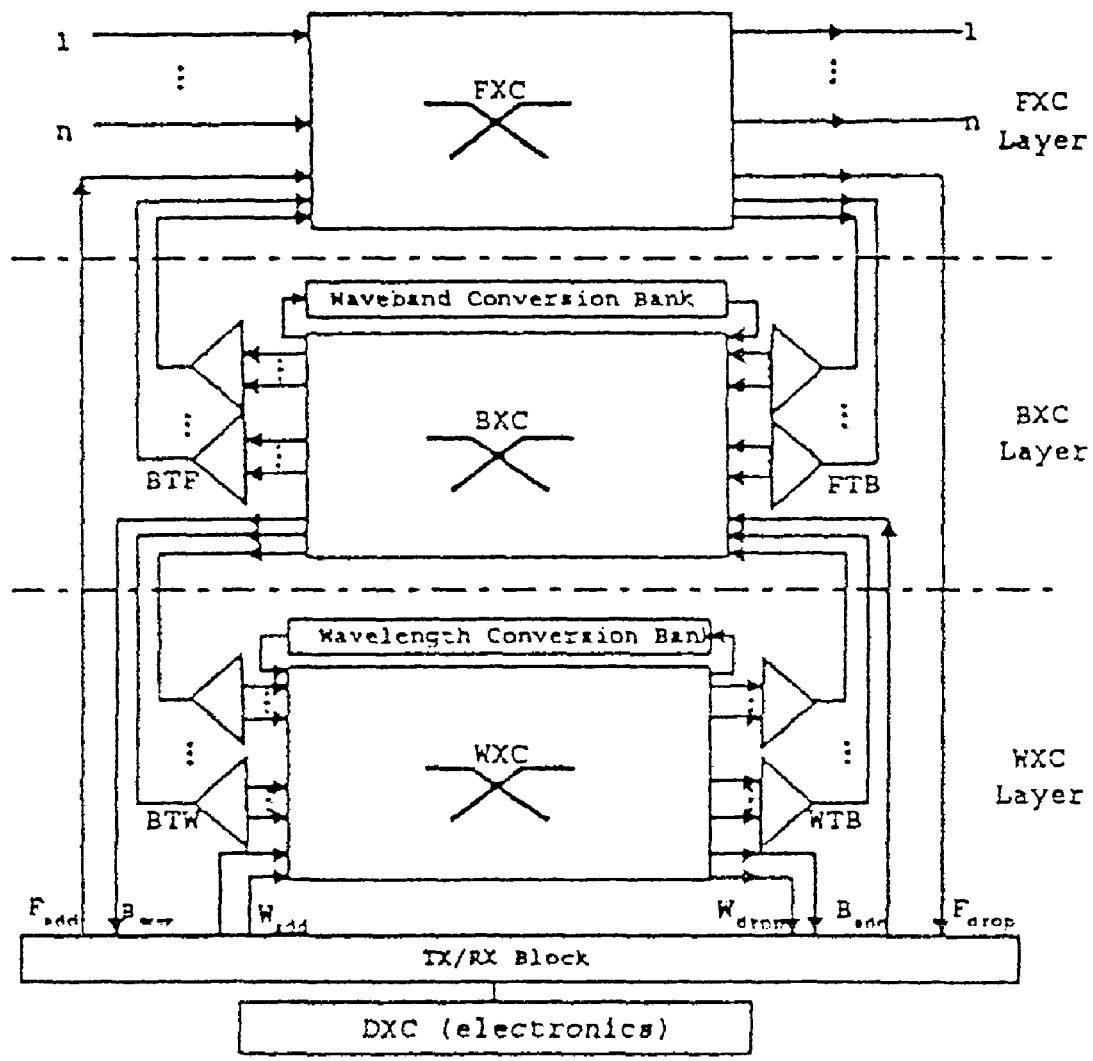
FIG. 1 illustrates a three-layer multi-granular photonic cross-connect.
Figure 2:
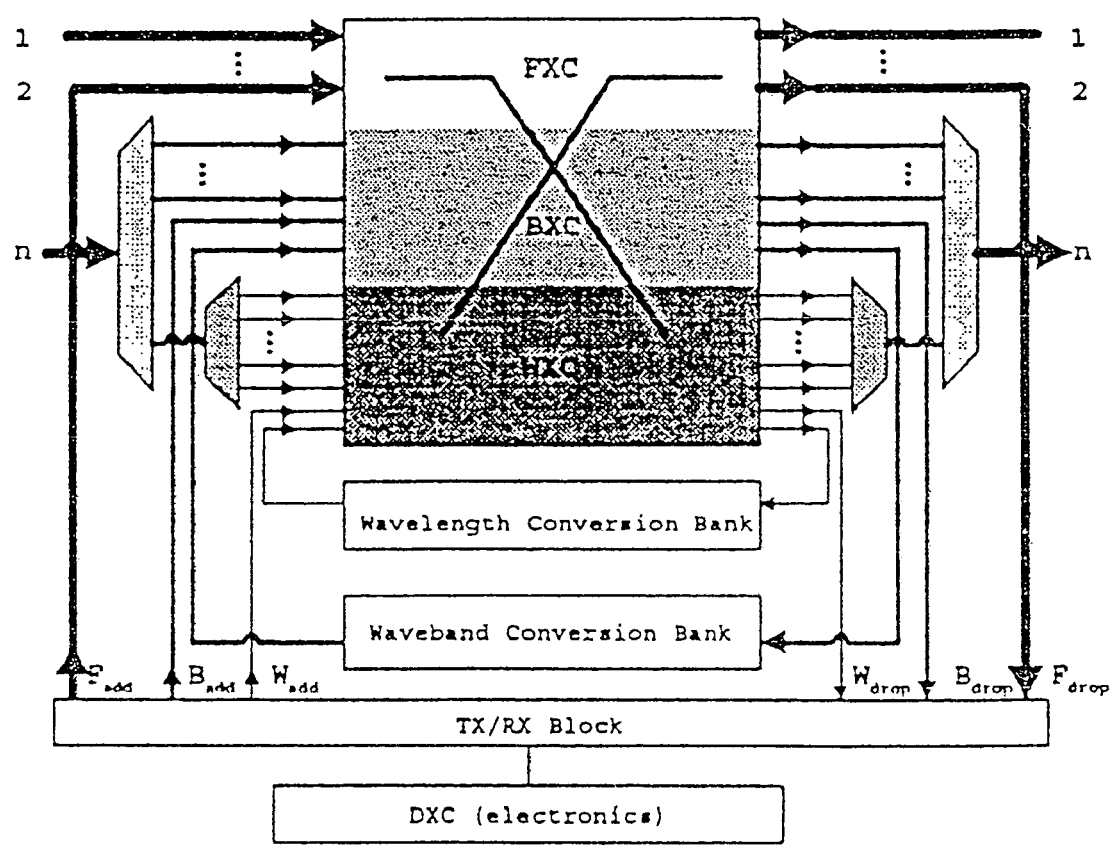
FIG. 2 illustrates a single-layer multi-granular photonic cross-connect.
Figure 3:
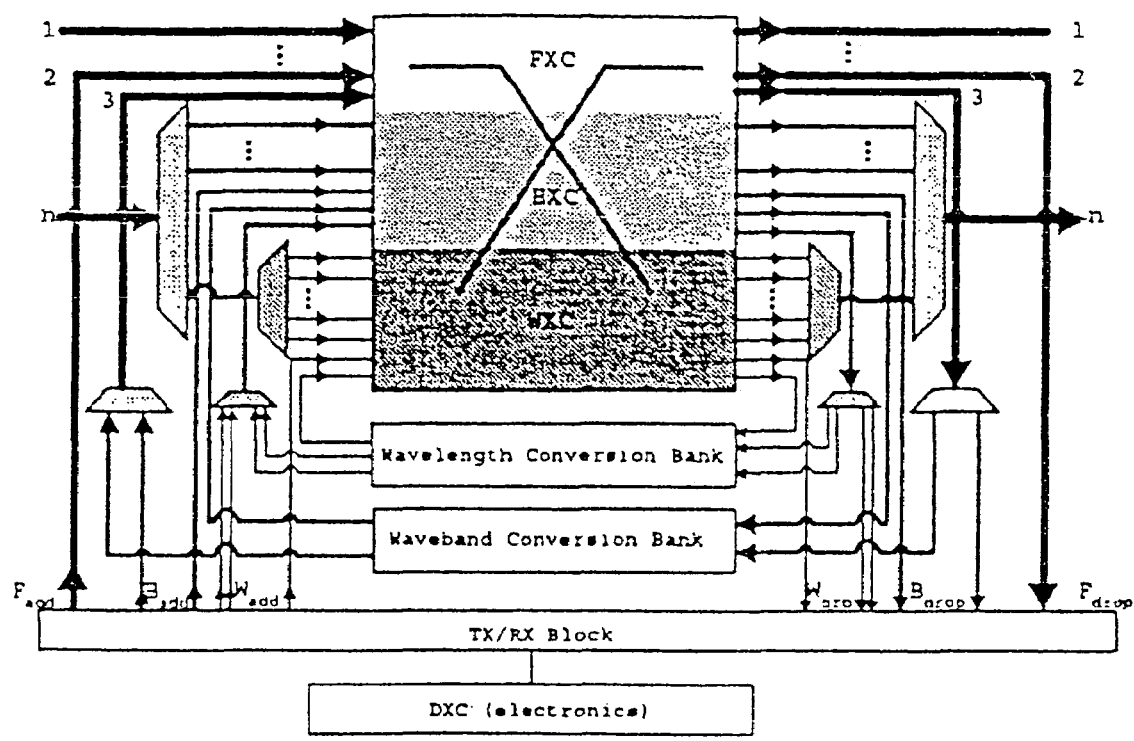
FIG. 3 illustrates a new single-layer multi-granular photonic cross-connect.

MG-OXC Architectures:

Prior research, typically considered MG-OXC architectures as shown in FIGS. 1 and 2. As already pointed out, these architectures themselves are our novel extensions (i.e., with wavelength and waveband conversion banks, Tx/Rx and DXC components) to existing architectures. Further, these architectures are either too complicated (FIG. 1) or too simple and restrictive (FIG. 2).

The third new MG-OXC we propose achieves a balance between the first two MG-OXCs. More specifically, like the second one, it is also a single-layer architecture so there is neither FTB/BTW demultiplexers nor BTF/WTB multiplexers for connecting different layers. It also has some "designated" fibers (and "designated" bands within these fibers), so it is not as (or too) flexible as the first (multi-layer) MG-OXC. On the other hand, what makes it different (and more powerful) than the first MG-OXC is that this MG-OXC does use a few FTB/BTW demultiplexers and BTF/WTB multiplexers so that even an "non-designated" fiber (band) can drop specific bands (wavelengths, respectively) without subjecting the other bands in the same fiber (wavelengths in the same band, respectively) to O/E/O conversions (through the Transmitter/Receiver block).

Efficient Network and MG-OXC design for Static Traffic

We now describe our integer linear formulation and heuristic algorithm for efficient MG-OXC network design for static traffic.

ILP Model for static WBS

This section formulated the WBS scheme using integer linear programming. The integer linear programming (ILP) formulation is for multi-fiber networks where the number of fibers per link is f>1. For single-fiber networks, f is always 1 and in fact can be omitted from the formulations.

To facilitate presentation and understanding of our ILP model, we define variables to describe the properties of a node (instead of a link as in other ILP formulations for RWA). More specifically, to obtain and represent the detailed information of the routing and wavelength assignment, we introduce the following binary variables to be used in the ILP formulation.

Note that the traffic at a node can be drop traffic, bypass traffic or add traffic. The following four variables: $V_{i,o,p}^{n,w}$, $W_{i,o}^{n,w} B_{i,o}^{n,b}$ and $F_{i,o}^{n}$ are used for describing the lightpaths, each of which can represent bypass traffic when $i \in I_n$, $o \in O_n$; add traffic when $i \in A_n$, $o \in O_n$ or drop traffic when $i \in I_n$, $o \in D_n$. An incoming (or outgoing) fiber refers to either an input (or output) fiber from (or to) a neighboring node or a fiber connecting the local node to any add (or drop) port at the WXC, BXC and FXC layer).

Figure 4:
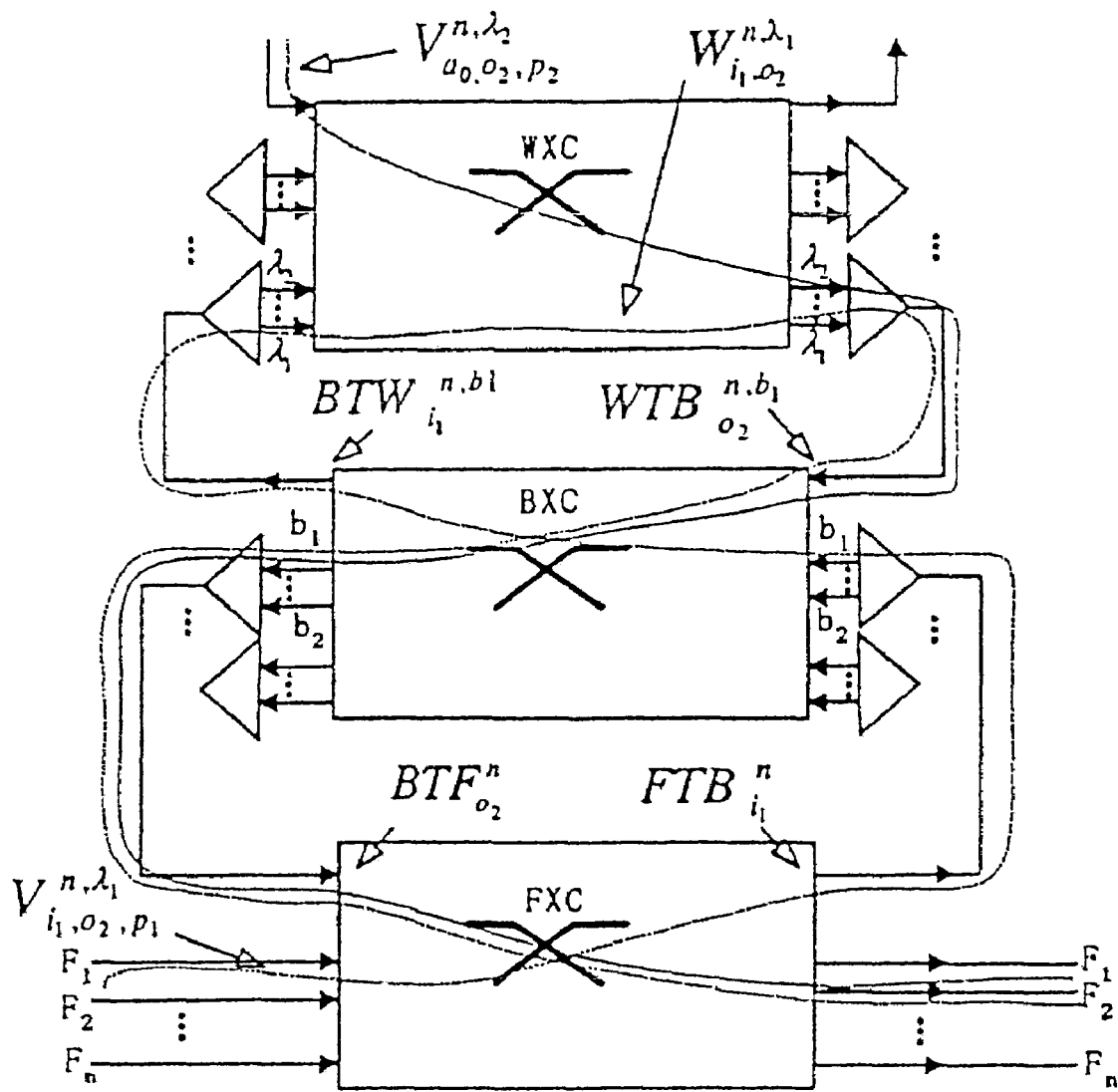
FIG. 4 illustrates a waveband at node.

As a consequence of multiplexing/demultiplexing, we need to use multiplexer/demultiplexer port(s) at the respective layers. FIG. 4 shows one such example involving two lightpaths, one for node pair $p_1$ using $\lambda_1$ on input fiber 1 and the other for node pair $p_2$ using $\lambda_2$ to be added locally. Using the MG-OXC, the two lightpaths are grouped together in the same band of the same output fiber (e.g., fiber 2). By definition, we have $V_{i1,o2,p1}^{n,\lambda 1} = V_{a0,o2,p2}^{n,\lambda 2} = 1$. For this, input fiber 1 (containing the lightpath for $p_1$) has to be demultiplexed into band $b_1$ (and other bands) using a FTB demultiplexer (hence, $FTB_{i1}^{n}=1$). Band $b_1$ then has to be further demultiplexed into $\lambda_1$ and other wavelengths (hence, $BTW_{i1}^{n,b1}=1$) to switch the lightpath for $p_1$ (hence, $W_{i1,o2}^{n,\lambda 1}=1$). The second lightpath for $p_2$ is added into band $b_1$ using a WTB multiplexer (hence, $WTB_{o2}^{n,b1}=1$). Now that the two lightpaths are in the same band, the band is multiplexed onto a fiber using a BTF multiplexer (hence, $BTF_{o2}^{n}=1$), and then transmitted onto output fiber 2.

Objection Function

Let $WXC_n$, $BXC_n$ and $FXC_n$ be the number of ports at WXC, BXC and FXC layers at node n, respectively. There are two reasonable objectives. The first is to minimize the total cost associated with the MG-OXC ports in the network, that is, $$\text{minimize} \left( \alpha \times \sum_n WXCn + \beta \times \sum_n BXCn + \gamma \times \sum_n FXCn \right) \quad (1)$$

where $\alpha$, $\beta$ and $\gamma$ are the coefficients or weights corresponding to the cost of each port at the WXC, BXC and FXC layer, respectively. When $\alpha=\beta=\gamma=1$, the objective becomes to minimize the total number of MG-OXC ports in the network, which is the sum of the port count at FXC, BXC and WXC layers respectively.

The second objective is to minimize the maximum cost at each node over all nodes. This can be formulated as:

$$\text{minimize} \max_n (\alpha \times WXC_n + \beta \times BXC_n + \gamma \times FXC_n)$$

(2)

When $\alpha=\beta=\gamma=1$, this becomes equal to minimizing the maximum port count (node size) over all the nodes in the network.

Constraints

For Routing and Wavelength Assignment, the following constraints on traffic flows, wavelength-capacity and wavelength-continuity are similar to those in the traditional RWA ILP formulations.

$$\begin{cases} \sum_{i \in An, o \in O_n} V_{i,o,p}^{n,w} = \sum_{i \in In, o \in D_n} v_{i,o,p}^{n,w} = 0 \; n \neq p.src, p.dest, \forall w & (i) \quad (3) \\ \sum_{w, i \in An, o \in O_n} V_{i,o,p}^{n,w} = tp \quad n = p.src, & (ii) \; \forall p; \\ \sum_{w, i \in In, o \in D_n} V_{i,o,p}^{n,w} = tp \quad n = p.dest, & (iii) \end{cases}$$

$$\sum_{p, o \in ODn} V_{i,o,p}^{n,w} \leq 1 \; \forall w, i \in I_n; \quad (4)$$

$$\sum_{p, i \in IAn} V_{i,o,p}^{n,w} \leq 1 \; \forall w, o \in O_n;$$

$$\sum_{i \in IAm, o \in O_{m,n}^f} V_{i,o,p}^{m,w} - \sum_{i \in I_{n,m,o \in OD_n}^f} v_{i,o,p}^{n,w} = 0 \; \forall m, n, p, w, f; \quad (6)$$

Equation (3) is the traffic flow constraint; Equations (4) and (5) are the wavelength capacity constraint; Equation (6) is the wavelength continuity constraint.

For Waveband Switching, we need the following additional constraints.

$$1 \geq F_{i,o}^n + B_{i,o}^{n,b} + W_{i,o}^{n,w} \geq \sum_p V_{i,o,p}^{n,w} \forall_w \in \pounds_b, i \in IA_n, o \in OD_n; \quad (7)$$

This constrains ensures that if a lightpath uses wavelength w belonging to band b of incoming fiber i and outgoing fiber o $$(\text{i.e.}, \sum_p V_{i,o,p}^{n,w} = 1),$$

then at node n, exactly one of FXC, BXC and WXC cross-connect port will be used for switching this lightpath when it is a bypass (i.e., $i \in I_n$, $o \in O_n$) or exactly one of $F_{add}$, $B_{add}$ and $W_{add}$ port will be used for adding this lightpath when in is added (i.e., $i \in A_n$, $o \in O_n$) or exactly one of $F_{drop}$, $B_{drop}$ and $W_{drop}$ port will be used for dropping this lightpath when it is dropped (i.e., $i \in I_n$, $o \in D_n$).

$$BTF_o^n \geq WTB_o^{n,b} \geq W_{i,o}^{n,w} \forall_w \in \pounds_{b,o} \in O_n; i \in IA_n; \quad (8)$$

The above constraint ensures that a wavelength w at node n switched or added at the WXC layer has to pass a WTB multiplexer to the BXC layer. At the same time, every band from a WTB multiplexer has to pass a BTF multiplexer before it can leave node n. Similarly, Equation (9) below specifies that a wavelength w switched or dropped at the WXC layer has to come from BXC layer using a BTW demultiplexer, and in addition every band demultiplexed by BTW can only come from a FTB demultiplexer.

$$FTB_i^n \geq BTW_i^{n,b} \geq W_{i,o}^{n,w} \forall_w \in \pounds_b, o \in OD_n; i \in I_n; \quad (9)$$

Finally, any bypass or add bands should pass a BTF multiplexer as specified in equation (10) and similarly, any drop or bypass band can only come from a FTB demultiplexer as specified in Equation (11).

$$BTF_o^n \geq B_{i,o}^{n,b} \forall_o \in O_n; i \in IA_n; \quad (10)$$

$$FTB_i^n \geq B_{i,o}^{n,b} \forall_o \in OD_n; i \in I_n; \quad (11)$$

For Port Numbers, the following constraints specify the minimum number of ports required at each layer of the MG-OXC.

$$WXC_n = \sum_{i \in IA_n, o \in OD_n, w} W_{i,o}^{n,w} \forall_n; \quad (12)$$

$$BXC_n = \sum_{i \in IA_n, o \in OD_n, b} B_{i,o}^{n,b} + \sum_{o \in O_n, b} WTB_o^{n,b} + \sum_{i \in I_n, b} BTW_i^{n,b} \forall_n; \quad (13)$$

$$FXC_n = \sum_{i \in IA_n, o \in OD_n} F_{i,o}^n + \sum_{o \in O_n} BTF_o^n \sum_{i \in I_n} FTB_i^n \forall_n; \quad (14)$$

For the WXC layer, the number of input-side ports include the ports for lightpaths coming in from other nodes and locally added lightpaths as specified in (12). The number of input-side ports needed at the BXC layer is the sum of the number of wavebands $B_{i,o}^{n,b}$ (BXC cross-connect and add/drop/bypass bands) and the number of wavebands from the WTB/BTW multiplexers/demultiplexers as in (13). Similarly, Equation (14) can be used to determine the number of ports at the FXC layer.

In short, our ILP model (and heuristics to be described next) considers the design of MG-OXC nodes (i.e., the number of ports allocated at each of the layers) with the objective to minimize either the total port count or the maximum port count over all MG-OXC nodes in the network given a set of traffic demands to be satisfied on a given network topology, wherein each link in the network may have single or multiple fibers.

Note that if we eliminate the FXC and BXC layers (i.e., set corresponding variables to 0) from the MG-OXC, the above ILP formulation with Objective (1) will minimize the total number of ports, which is equivalent to minimizing WHs using ILP for optimal RWA. As such ILP formulations developed can only be solved for small systems with a few nodes and a few wavelengths on each fiber, we need to develop efficient heuristic-based solutions for large systems.

Balanced Path Routing with Heavy-Traffic First Waveband Assignment (BPHT), Heuristic Algorithm for Efficient WBS Intuitively, to maintain wavelength-continuity in wavelength routed optical networks without wavelength conversion, it is better to assign wavelengths to longer paths (in terms of hops) first. Further, to reduce the number of ports in MG-OXC, it is better to assign paths that have maximum number of links in common, wavelengths in the same fiber (and band), thus increasing the probability of switching the whole fiber (and band) by just using a single FXC (and BXC) port. The following is our three-stage heuristic algorithm called Balanced Path routing with Heavy-Traffic (BPHT) first waveband assignment, which tries to maximize the reduction in the MG-OXC size using the above ideas.

Stage 1: Balanced Path Routing

In this stage, we use the following steps to achieve load balanced routing.

Find K-shortest routes for every node pair (s,d) with non-zero traffic demand as in [40], and order them from the shortest to the longest (in terms of hop number) as $P_{s,d}^1$, $P_{s,d}^2$, ..., $P_{s,d}^k$. Let the number of hops of the shortest route be $H_{s,d}$ (i.e., number of hops in path $P_{s,d}^1$).

Define the load on every link 1 to be the number of routes already using link 1 (initially, this is 0). Let C be the maximum link load over all the links.

Use C to achieve load balanced routing, starting with the node pair (s,d) with the largest $H_{s,d}$ value over all node pairs, to determine the route for each node pair. More specifically, for the K-shortest routes $P_{s,d}^i$ of the selected node pair (s,d) where i=1,2, ..., k, we compute the C and pick one of the routes that minimizes C. If more than one routes, say $P_{s,d}^i$ and $P_{s,d}^j$, have the same minimum C, the shortest one (i.e., $P_{s,d}^i$, if i<j) will be used as the route for (s,d). That is, all the lightpaths from s to d will take this route. After the route for (s,d) is chosen, the process continues to choose one route for each of the remaining node pairs, starting with the one having the largest number of hops along the shortest path, until every node pair with non-zero traffic demand is assigned a route.

Stage 2: Wavelength Assignment

Based on the observation that bypass traffic, which goes through two or more hops accounts for 60% –80% of the total traffic in the backbone, we assign the wavelengths to those bypass lightpaths first. At the same time, we also want to give preference to the lightpaths that overlap with many other (shorter) lightpaths in order to maximize the advantage of wavebanding.

The following steps are used to assign wavelengths to all the lightpath demands once the routing is done in Stage 1. To maximize the benefit of WBS in multi-fiber networks, we introduce a new waveband assignment algorithm, called waveband assignment for multi-fiber WBS (WA-MF-WBS, see Step (D) below).

(A) For every node pair (s,d), whose route is determined as $s=s_o \to s_1 \to s_2 \ldots s_{n-1} \to s_n = d$ in Stage 1, define a set $Q_d^s$, which includes all node pairs $(s_i, s_j)$, whose route is $s_i$, $s_{i+1}, \ldots, s_j$, as determined in Stage 1, where $0 \leq i \leq n-2$, and $i+2 \leq j \leq n$. Note that it is possible that the route chosen for $(s_i, s_j)$ in Stage 1 is not a sub-path of the route chosen for (s,d), in which case, $(s_i, s_j)$ will not belong to $Q_d^s$.

(B) Calculate the weight for each set $Q_d^s$ as $$W_{sd} = \sum_{p \in Q_d^s} h_p \times t_p,$$

where $p=(s_i, s_j) \in Q_d^s$, $h_p$ is the number of hops and $t_p$ is the required number of lightpaths from $s_i, s_j$;

(C) Find the set $Q_d^s$ with the largest $W_{sd}^*$.

*Note that by starting with set $Q_d^s$ with the largest $W_{sd}$, we implicitly try and assign wavelengths to the pairs which have maximum number of lightpath requests (i.e., heavy traffic) first.

(D) Call set $Q_d^s$ as L, and assign wavelengths to L as follows.
  i. Suppose that the longest path in L is as follows: $s_o \to s_1 \to s_2 \ldots s_{n-1} \to s_n$. Let $s=s_o$ and $d=s_n$ (which is the case initially based on the definition of $Q_d^s$). Assign wavelengths to the requested lightpaths for the node pair (s,d) by trying to group them into the same fiber, and within each fiber, into the same band(s). More specifically, for each fiber, let $0 \leq w \leq K-1$ and $0 \leq b \leq B-1$ be the index of wavelength and band respectively, starting from which, an available wavelength and band will be searched in order to fulfill new lightpath requests; In addition, let $0 \leq f \leq F-1$ be the index of the fiber currently under consideration (i.e., whose wavelengths may be used for new lightpaths). Initially, $f=0$ and $w=b=0$ for all fibers. The following algorithm WA-MF-WBS assigns wavelengths to the lightpaths for a specified node pair p for multi-fiber†wavelength band switching.

†Algorithm WA-MF-WBS is also used to obtain the results for single-fiber networks ii. Use WA-MF-WBS to assign wavelengths to the requested lightpaths for $(s, s_j)$ starting with the largest j (i.e., j=n−1, n−2, . . . ,2).
  iii. Use WA-MF-WBS to assign wavelengths to the requested lightpaths for $(s_i, d)$ starting with the smallest i (i.e., i=1, 2 . . . , n−2).
  iv. If there are still node pairs $(s_i, s_j) \in Q_d^s$ that have not been considered, repeat from Step (D) by treating $S_i$, with the smallest i as s, and $s_j$ with the largest j as d. Otherwise go to Step (E).

(E) Recompute the weight for those node pairs whose routes use any part of the route used by node pair (s,d). For each fiber, re-adjust b and w to be the "next" waveband and the first wavelength in the next waveband, respectively, so as to prevent the lightpaths of the next node pair (e.g., $Q_{d'}^{s'}$) from using the same bands as the lightpaths of $Q_d^s$ (thus reducing the need to demultiplex and multiplex the lightpaths belonging to these two sets when they merge and diverge). More specifically, set b=(b+1) mod B, and w=b×W, and then go to step (C). Repeat until all the bypass (multi-hop) lightpath demands are satisfied.

---

Algorithm: WA-MF-WBS

--- while $t_p$ > W do

Find a fiber starting from index f that has as many free bands as possible $\left( \text{say } a \leq \left\lfloor \frac{tp}{W} \right\rfloor \right)$ {

Call the found fiber g, where g may or may not be the same as f;
    Assign the bands in fiber g to the a · W lightpaths for p;
    $t_p = t_p - a \cdot W$;
    Set f=g, and update w and b for fiber g accordingly;
    }
end while
while $t_p$ > 0 do
    Find a fiber (g), starting from index f, that has at least one
    free wavelength; Assign a free wavelength (x), starting from
    index w, to a lightpath for p, where x is most likely to be w;
    $t_p = t_p - 1$;
    Set f = g, and w = x + 1. Also, update b for fiber g accordingly;
end while

---

Figure 5:
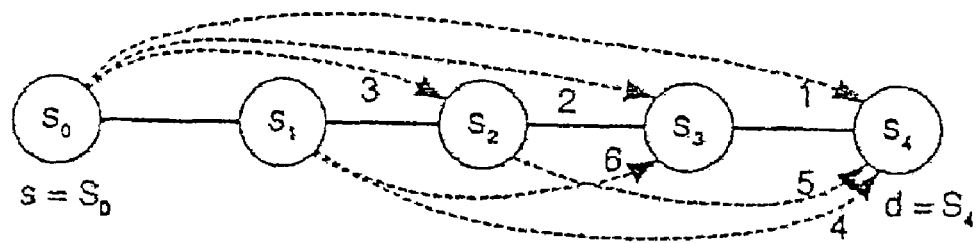
FIG. 5 illustrates an example illustrating Steps (C) and (D) in Stage 2 of BPHT.

For example, suppose that we are considering node pair set $Q_4^o$ in FIG. 5, where $t_p=1$ for any $p \in Q_4^o$. Assuming that the lightpaths numbered from 2 to 6 will be routed along the same route as the lightpath 1 (i.e., $s_o \to s_1 \to s_2 \ldots s_3 \to s_4$) as dictated by the load balanced routing algorithm. Then, the weight of the node pair set is 16 as shown, and in addition, the order in which these lightpaths will be assigned wavelengths according to Steps (C) and (D) is from 1 to 6.

(F) Finally, assign wavelengths to lightpaths between two nodes separated by only one hop, starting with the node pair having the largest lightpath demand.

Stage 3: Waveband Switching

Once the wavelength assignment is done, WBS can be performed in a fairly straight-forward way. Basically, we switch as many fibers using FXCs as possible; and then as many wavebands using BXCs as possible. The remaining lightpaths are then individually switched at the WXC layer. The total number of ports used at a given node can then be determined.

Ideally, BPHT will group traffic from the same source to the same destination, and most of the traffic that has common intermediate links. One of the variations of BPHT (in Stage 1) is to balance the amount of traffic (in terms of the actual number of lightpaths instead of just one route for each node pair) on every link. Another variation is to assign wavelengths to lightpaths with the largest hop count or those for node pairs with the largest weighted traffic demand (i.e., $h_p \times t_p$) first (assuming e.g., shortest-path routing) in Stage 2. We call the heuristic that varies from BPHT at both Stages 1 and 2 in such a manner, Balanced Traffic routing with Maximum-Hop first waveband assignment (BTMH). In our experiments, we have compared many heuristics and found that the overall performance of BPHT is the best.

Dynamic Traffic

In this section, we describe our ILP and heuristic algorithm based solutions for efficient WBS for dynamic traffic.

Figure 6:
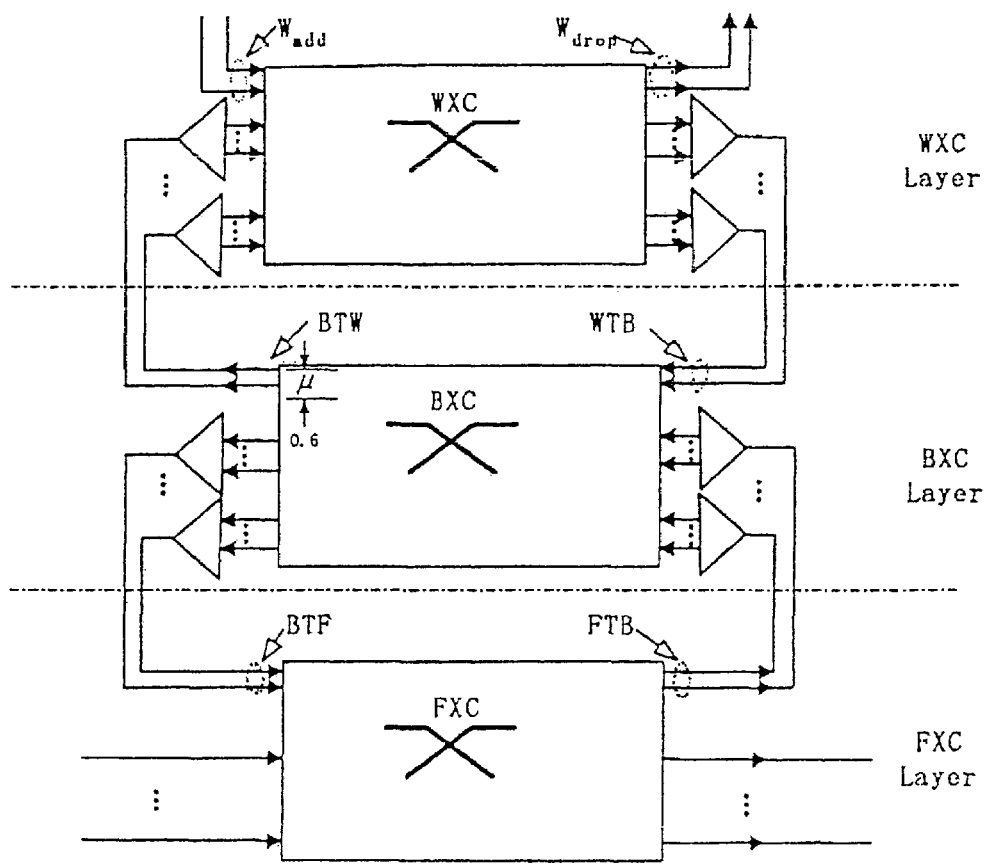
FIG. 6 illustrates MG-OXC Architecture for dynamic WBS.
Figure 7:
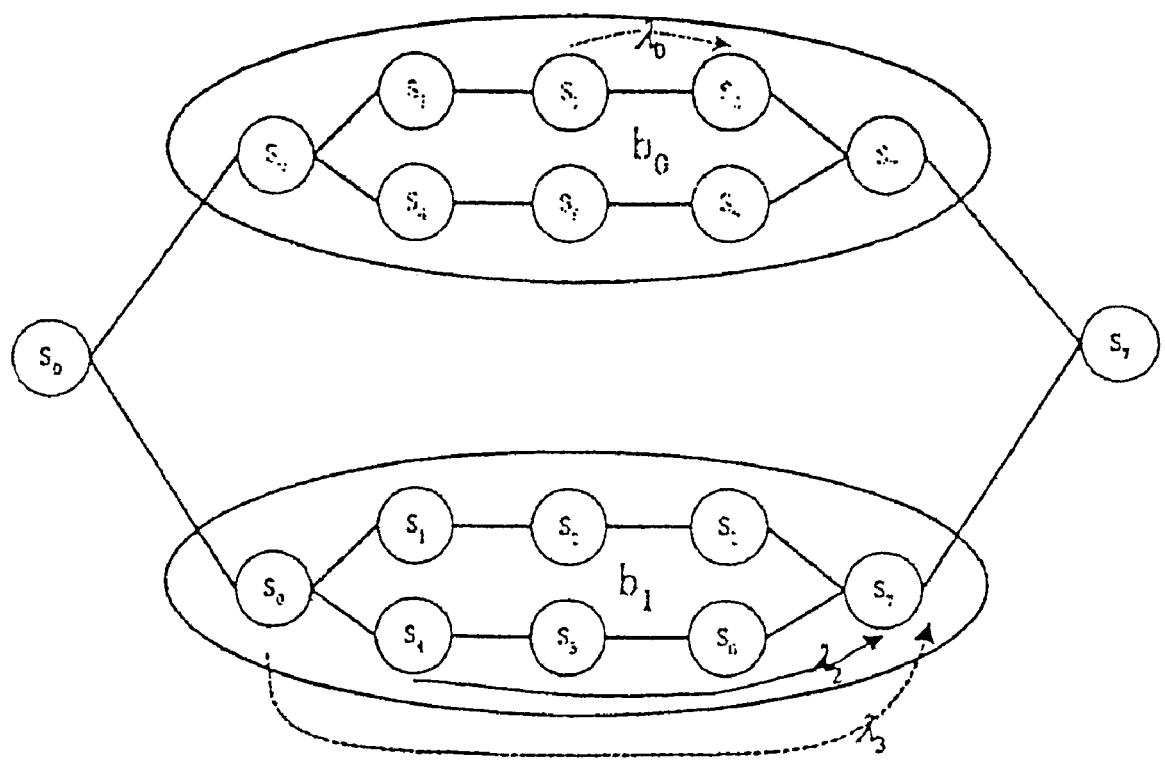
FIG. 7 illustrates band layer.

We assume that traffic can only be added/dropped from the WXC layer as shown in FIG. 6. Hence, while counting the ports, we will ignore the ports for add/drop traffic at the FXC and BXC layers.

From the figure we note that:

FXC layer has $2*\delta*F$ ports, which is the upper bound [41].

At BXC layer, we assume only $\mu*\delta*F*B$ bands can go through BTW to WXC layer and band drop ports ($0<\mu\leq 1$), so only $(1+\mu)*F*B$ ports are needed in this layer.

WXC layer has $\mu*\delta*F*B*W$ ports.

Hence, the total number of ports can be calculated as follows:

$$MG\text{-}OXC_n = 2*\delta*F + (1+\mu)*\delta*F*B + \mu*\delta*F*B*W \quad (15)$$

Similarly, we can get the total number of ports of a node in an ordinary-OXC network as $OXC_n = \delta*F*B*W$ Since the MG-OXC reduces the cost (i.e., number of ports) of OXC nodes, we can expect that: $MG\text{-}OXC_n < OXC_n$, i.e., number of ports at a MG-OXC node n is less that that at an ordinary-OXC node. Hence we have:

$$2*\delta F + (1+\mu)*\delta*F*B + \mu*\delta*F*B*W < \delta*F*B*W \quad (16)$$

$$\mu < \frac{B*W - BN - 2}{B + B*W} = \frac{K - B - 2}{K + B} \quad (17)$$

This equation shows us how to approximately decide the value of $\mu$. It also indicates that if B increases, $\mu$ should decrease (note that the lower the value of $\mu$ the better), which means that if the wavelengths in a fiber are grouped into many bands (i.e., by increasing the number of bands in a fiber), then the chances for a lightpath to go through WXC layer will be smaller, hence $\mu$ should also be smaller. We can also get the total number ratio T(a) (i.e., port count of MG-OXC/port count of OXC) as follows.

$$T(a) = \frac{2*\delta F + (1+\mu)*\delta*F*B + \mu*\delta*F*B*W}{\delta*F*B*W} \approx \mu + \frac{1+\mu}{W} \quad (18)$$

Online ILP Model for Dynamic WBS

Based on current network status, we try to satisfy the traffic demand with minimum active ports or wavelength.

Similar to our previous Static Traffic case, we can get ILP model for dynamic Incremental traffic. The difference is that now we have a limited number of BTW/WTB demultiplexers/multiplexers, and no add/drop fibers, bands at a node.

Objective: minimize the activate ports.

Constraints: All constraints from the static version can be used here. Additional constraints on the limited number of BTW/WTB demultiplexers/multiplexers are needed as follows:

$$\mu*\delta*F*B \geq \sum_{o\in O_n} WTB_o^{n,b} \forall_b \quad (19)$$

$$\mu*\delta*F \geq \sum_{i\in I_n} BTW_i^{n,b} \forall_b \quad (20)$$

Another version of the ILP formulation in which a BTW/WTB demultiplexer/multiplexer can be configured to demultiplex/multiplex any bands is as follows:

$$\mu*\delta*F*B \geq \sum_{i\in O_n,b} WTB_o^{n,b} \forall_b \quad (21)$$

$$\mu*\delta*F*B \geq \sum_{i\in I_n,b} BTW_i^{n,b} \quad (22)$$

Our heuristic algorithms use the ideas in this second formulation.

Maximum Interference Waveband Routing and Assignment (MIWRA)

As shown by others, the interference length (L) is an important parameter for optical network. The interference length of a lightpath is defined as the number of hops (along their respective routes) that it has in common with other existing lightpaths. It is also shown that the gain of having wavelength conversion will decrease with large L. Our heuristic MIWRA, tries to route demands such that L is maximized, i.e., the overlap with other existing demand routes is maximized. This in turn leads to maximum packing of traffic demands into bands further leading to reduced port count.

Based on the above ideas and on layered band-graph approach, we do waveband routing and assignment as follows:

Routing: Try K-shortest path, and choose the path, which has largest interference length (L).

Waveband Assignment: First-Fit based on band/port number restriction and minimum weight (as described below)

Here is an example: The network topology is just as anyone of the layers (every band has one layer), wherein each fiber has two bands $b_0$ and $b_1$, and each band has two wavelengths. Currently, there are already two light paths: $\lambda_0(S_2 \rightarrow S_3)$ and $\lambda_2(S_4 \rightarrow S_5 \rightarrow S_6 \rightarrow S_7)$ and a new lightpath demand from $S_0$ to $S_7$. From the topology, we can have two paths to route the demand: $k_0(S_0 \rightarrow S_1 \rightarrow S_2 \rightarrow S_3 \rightarrow S_7)$ and $k_1(S_0 \rightarrow S_4 \rightarrow S_5 \rightarrow S_6 \rightarrow S_7)$.

To satisfy this new lightpath demand, we will try following steps:

1. Within every layer, calculate the weight for every (k,b) pair, $W_k^b$, where $0\leq k<K$ is the index of shortest path, $0\leq b<B$ is index of band. We have the following three methods to set the weight.

$W_k^b = h$, where h is the hop number, or $$W_k^b = \frac{1}{L},$$

where L is interference length L (number of shared links), or $$W_k^b = \frac{h}{L}.$$

2. Find the minimum $W_k^b$, which can satisfy the demand. Then assign the corresponding wavelength to the new demand in layer b and using the kth shortest path.

3. If no layer can satisfy this demand, then block it.

In this example, if we are trying to maximize the Interference length L, then we have, $W_{k0}^{b0}=1$, $W_{k0}^{b0}=\frac{1}{3}$. We will try to route the lightpath along $k_1$ and use $\lambda_3$ satisfy the new demand in layer $b_1$ as shown by the broken line in the figure.

Similarly, if we have wavelength conversion, to reduce the port count using minimal wavelength conversion, we should try to satisfy the demand within one (i.e., the same) band as much as possible, hence using less wavelength conversion.

Waveband Versus Wavelength Conversion

In WRNs, wavelength conversion capabilities can be incorporated at either all or some of the OXCs (the latter is referred to as sparse wavelength conversion). With wavelength conversion, a lightpath no longer has to occupy the same wavelength on all the links that it spans (this is called the wavelength-continuity constraint). Wavelength conversion can also be full or limited (or partial) in the latter case, a wavelength can be converted only to a subset of the wavelengths. Prior research on wavelength conversion in WRNs has in general confirmed the benefit of wavelength conversion in reducing blocking probability, and to a lesser extent, in reducing the wavelength requirement to carry a given set of traffic demands (this of course is dependent on the traffic and topology). In addition, major benefit can most likely be obtained by using sparse wavelength conversion and/or limited wavelength conversion.

Although there has been a significant amount of research on the benefit of wavelength conversion in WRNs, none of the existing works have considered the benefit of waveband conversion in WBS networks with MG-OXCs. In fact, all existing research on WBS networks either assumes full or no wavelength conversion at all the nodes. Note that, it is obvious that wavelength conversion can ease wavelength requirement and facilitate waveband assignment, and thus may also reduce the port count (and multiplexers/demultiplexers) required in MG-OXCs. To perform wavelength conversion, it is required that the fiber carrying the wavelength(s) to be converted be demultiplexed into bands, and then into wavelengths, thus consuming resources (e.g., ports and multiplexers/demultiplexers) in the MG-OXCs. In our invention, we examine the tradeoffs involved in using wavelength conversion in WBS networks.

The following example show that while in WRNs with full wavelength conversion, wavelength assignment is trivial, in WBS networks, one must assign wavelengths judiciously in order to reduce the port count of MG-OXCs. In this example shown in FIG. 8, assume that there is one fiber on each link with two bands, each having two wavelengths (i.e., $\{\lambda_0,\lambda_1\} \in b_0$, $\{\lambda_2,\lambda_3\} \in b_1$. However, wavelength $\lambda_2$ is not available on any of the links shown. In addition, there are three existing lightpaths, one from node 1 to node 5 using $\lambda_0$, the second from node 2 to node 4 using $\lambda_3$ and the third from node 6 to node 4 using $\lambda_3$. Hence, the only wavelengths available on the link from node 4 to node 5 are $\lambda_1$ and $\lambda_3$.

Figures 8A, 8B:
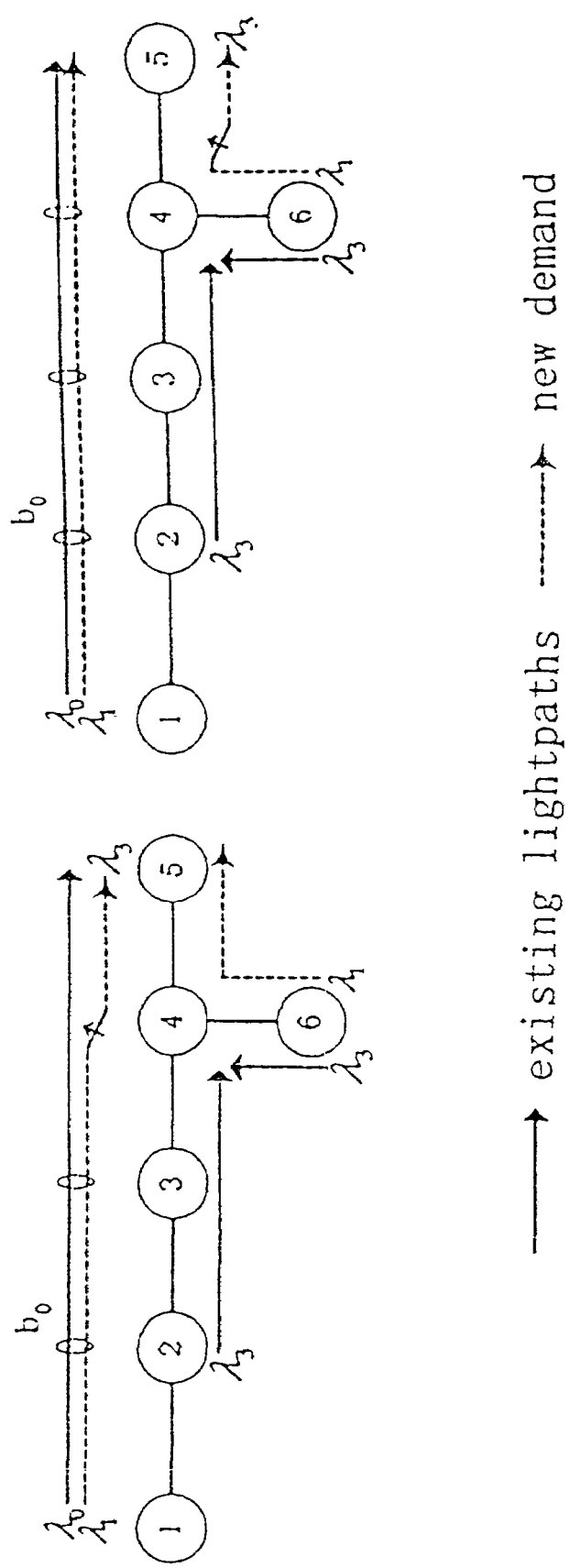
FIG. 8 illustrates wavelength and waveband conversion.

Now assume that a new lightpath using e.g., $\lambda_1$ on the link from node 6 to 4 is assigned $\lambda_1$ on the link from node 4 to node 5 as shown in FIG. 8(a). As a result, another new lightpath from node 1 to node 5 must then use $\lambda_1$ on links from node 1 to node 4, and then be converted to $\lambda_3$ on the link from node 4 to node 5.

Alternately, as shown in FIG. 8(b), one can assign $\lambda_3$ to the first new lightpath on the link from node 4 to node 5, and assign $\lambda_1$ to the second new lightpath all the way from node 1 to node 5. In a WRN, this alternative does not result in much difference at all as it also requires a wavelength conversion at node 4. However, in a WBS network using MG-OXCs, this alternative will require fewer ports. The reason is that in FIG. 8(b) band $b_0$ no longer needs to be demultiplexed at node 4. Note that, performing a wavelength conversion to the first new lightpath does not increase the port count because even in FIG. 8(a), band $b_0$ on the fiber from node 6 to node 4 carrying the first new lightpath needs to be demultiplexed into wavelengths so that its $\lambda_1$ can be multiplexed with $\lambda_0$ on the link from node 4 to node 5.

In addition, none of the prior research has studied the benefit of waveband conversion (without full wavelength conversion) in WBS networks. Having waveband conversion is similar to, but not identical to having limited wavelength conversion. For example, if we assume there are 2 wavelengths in each band (i.e., $\{\lambda_0,\lambda_1\} \in b_0$, $\{\lambda_2,\lambda_3\} \in b_1$, $\{\lambda_4, \lambda_5\} \in b_2$, . . . ). Then with waveband conversion, converting band $b_0$ to bands $b_1$ or $b_2$ is similar to having limited conversion, i.e., $\lambda_0$ can only be converted to $\lambda_2$ or $\lambda_4$, while $\lambda_1$ can only be converted to $\lambda_3$ and $\lambda_5$. On the other hand, the difference is that, with waveband conversion, we are now forced to convert $\lambda_0$ to $\lambda_2$ and also $\lambda_1$ to $\lambda_3$ at the same time. Moreover, waveband conversion can be accomplished using novel technologies without having to demultiplex each band into individual wavelengths, which could be a major benefit in terms of reducing the port count of MG-OXCs.

For the above reasons, we provide the benefits as well as limits of utilizing waveband conversion in WBS networks, and compare them with the benefits of (as well as tradeoffs involved in) using wavelength conversion. More specifically, we provide various MG-OXCs with waveband (and/or wavelength conversion) capabilities, and WBS algorithms that can take advantage of such capabilities in terms of costs (e.g., number of ports and number of wavelengths), performance (throughout and blocking probability) and complexity (algorithmic and control), in the same context as what has been described in the previous two subsections.

Waveband Failure Recovery in MG-OXC Networks

Due to the high bit rate of a single wavelength (up to 40 Gbps), network survivability becomes an important design problem in optical networks. Protection and restoration schemes for failure recovery from a broken fiber link or an OXC node (or in general a failed Shared Risk Link Group or SRLG) have been studied extensively. However, previous research has only examined recovery from such a failure at either the fiber or wavelength level in WRNs, and studied the tradeoffs involved in recovery at these two different levels.

With the introduction of multi-granular WBS networks, a waveband may fail because of a malfunctioning port at, the BXC layer, a broken waveband multiplexing/demultiplexers or waveband converter. If the other bands in the same fiber are not affected by the failure, simply recovering the traffic carried by the affected band can be more bandwidth efficient (or more likely) to succeed in restoring the traffic) than recovering the traffic carried by the entire fiber (as if the fiber is cut) although the latter is more simple and has a faster response/restoration time. Even when a fiber is cut, treating the traffic carried by one band as a basic unit for recovery can achieve a useful balance between treating the entire fiber or each individual wavelength as a basic recovery unit. We study not only the tradeoffs involved in recovery from a fiber link failure at the band level (as opposed to the fiber or wavelength level), but also provide new ways to recover from waveband or wavelength failures in WBS networks as to be described next.

Novel Band-Segment Based Failure Recovery

While recovering at the fiber level is done via link protection/restoration, recovering at the wavelength level is often done via path protection (where an entire lightpath is routed from the source). To recover at the band level, it may be useful to first define band-segment or BS of a given band $b_i$ to be the portion of fiber route between two MG-OXCs such that $b_i$ is formed (e.g., multiplexed from wavelengths using a WTB) at the first MG-OXC and then demultiplexed into wavelengths at the second MG-OXC (e.g., using a BTW). That is, within an BS, the lightpaths carried in the band are not switched individually. Two examples of active (also called primary or working) band-segments are shown in FIG. 9. The first, denoted by ABS0, goes from node 1 to node 3 via node 2, carrying two active lightpaths AP0 and AP1 (the former is dropped at node 3). The second by ABS1, goes from node 3 to node 4 carrying two active lightpaths AP1 and AP2 (the latter is added at node 3).

Figure 9A:
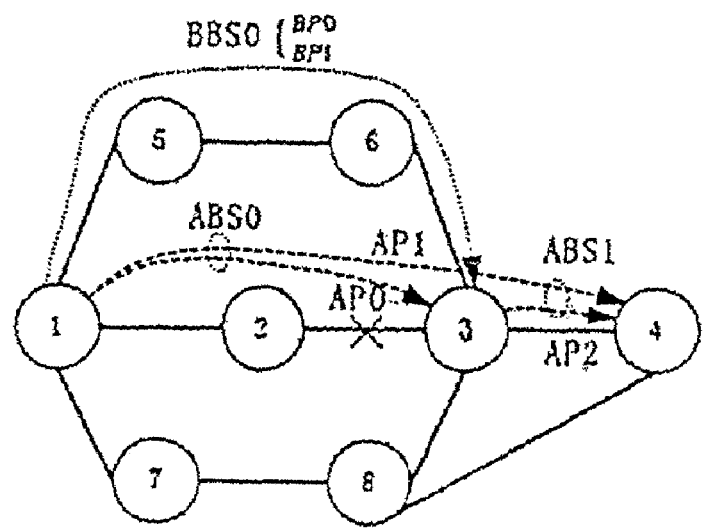
FIG. 9 illustrates recovery schemes using WBS.
Figure 9B:
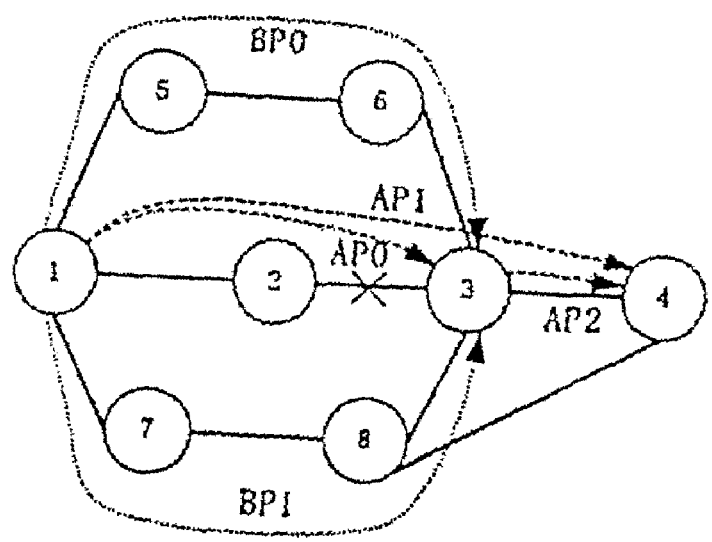

Based on the concept of band-segment (BS), failure recovery can be accomplished in two ways as shown in FIGS. 9(a) and (b), respectively. The first approach is to recover the affected ABS0 as a basic unit using one backup (or alternate) BS, denoted by BBS0 (which includes backup lightpath BP0 and lightpath segment BP1) as shown in FIG. 9(a). The second approach is to recover each individual lightpath/lightpath segment carried in the affected band-segment as a unit. Note that, this is similar but not identical to recovering at the wavelength level without regard to the concept of BS.

More specifically, if only the lightpaths with same source and destination are grouped into a band, it is convenient to protect all the lightpaths in a waveband segment. Otherwise, a lightpath may transit one or more band-segment along its route as API does in FIG. 9, which reduces the port count but complicates things like fault localization. Such issues in failure recovery are unique to WBS networks, and have not been researched.

New Backup Bandwidth Sharing Techniques

Figure 10A:
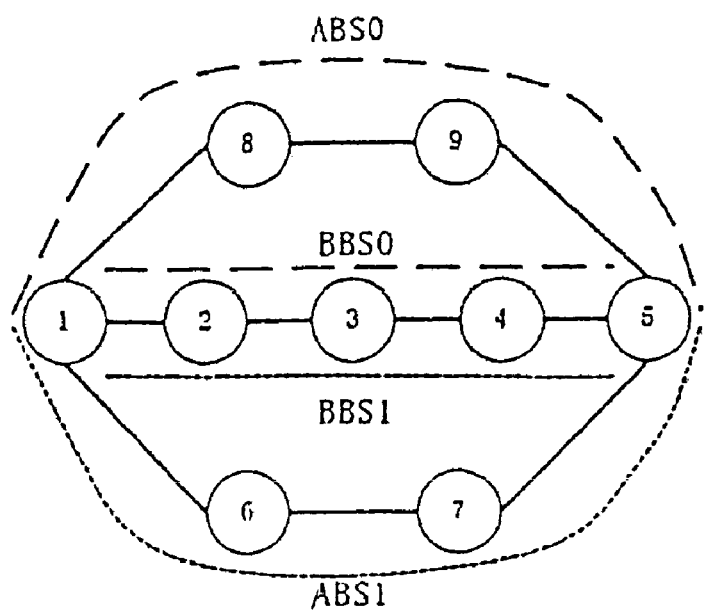
FIG. 10 illustrates backup bandwidth sharing using WBS.

We also investigate how backup bandwidth sharing can be achieved in band-segment based protection scheme. As shown in FIG. 10(a), when the two active band-segments ABS0 and ABS1 (in two different fibers) are node-disjoint, their respective backups BBS0 and BBS1 can share bandwidth, and still recover any single failure (of a fiber link or a node other than node 1 or 5) in the network.

Figure 10B:
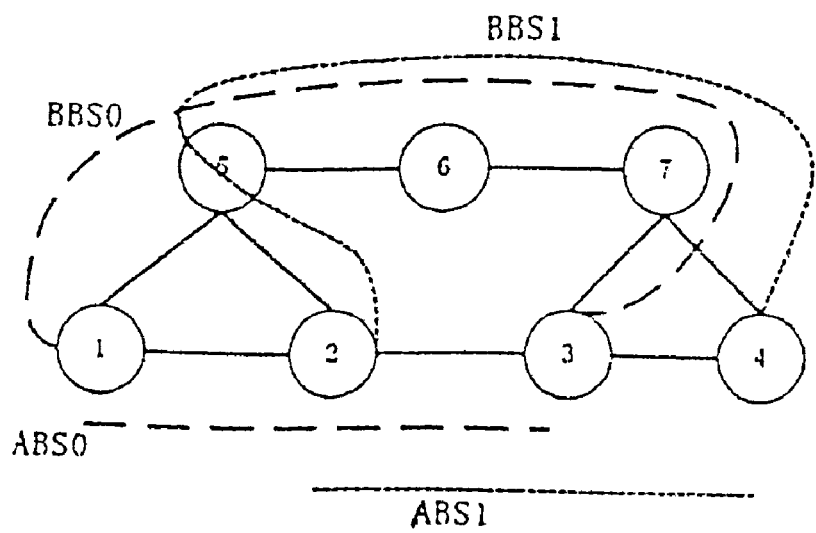

While the above is similar to shared mesh (path) protection in WRNs, the following example shows unique backup bandwidth sharing opportunities in band-segment based protection in WBS networks. As shown in FIG. 10(b), even though ABS0 and ABS1, which can be in the same fiber or two different fibers, are not link disjoint, their corresponding BBS0 and BBS1 can still share the bandwidth on links 5→6→7 as long as only one band, either ABS0 or ABS1, can fail if the two bands are in the same fiber (or if they are in two fibers, as long as only one fiber can fail). In fact, using the novel technique called band-merging to be described next, BBS0 and BBS1 may use the same backup band-segment on links 5→6→7 even if both ABS0 and ABS1 are affected by the broken link 2→3.

Unique Band Swapping and Merging Techniques

Figures 11A, 11B:
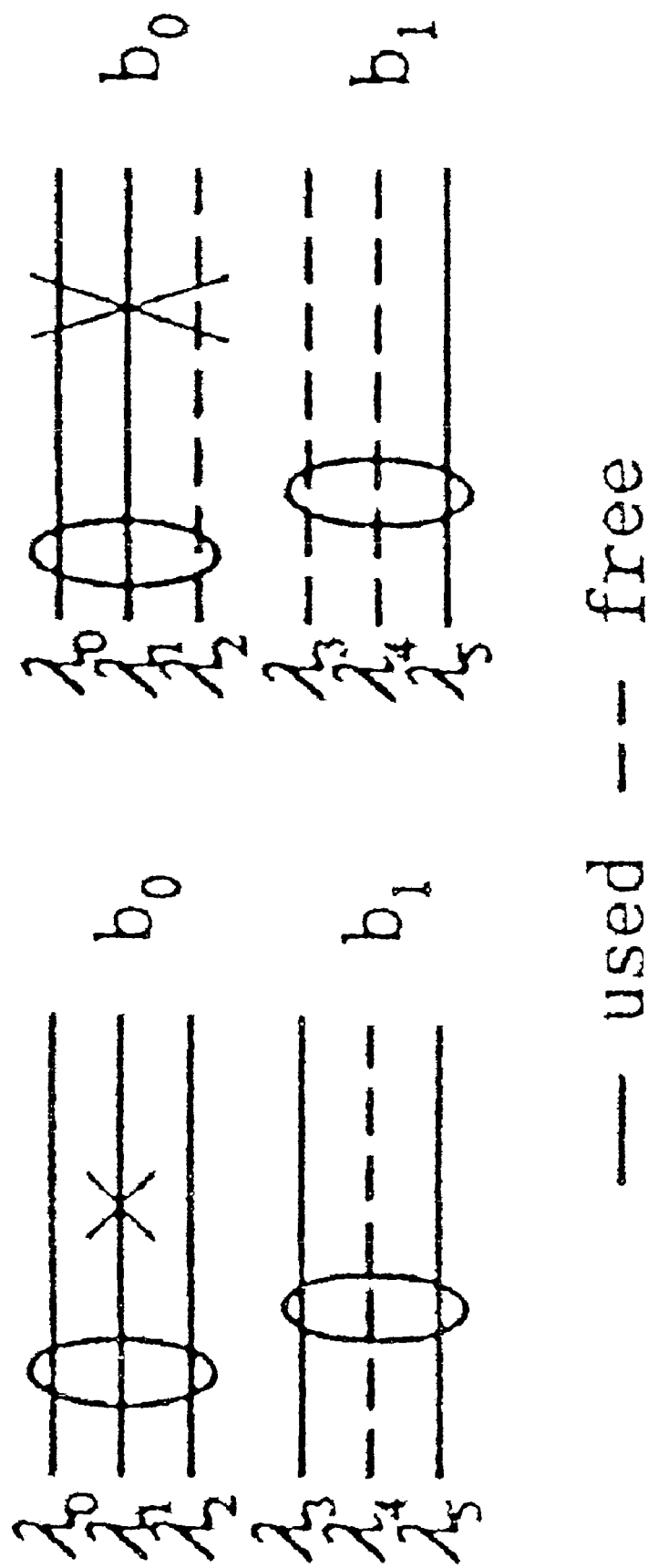
FIG. 11 illustrates band swapping and merging for intra-link failure restoration.

We provide the novel use of waveband conversion (and wavelength conversion) in failure recovery. For example, assume that a fiber has two bands $b_0$ and $b_1$, each with 3 wavelengths as shown in FIG. 11(a). Further assume that all wavelengths except $\lambda_4$, are used. Now assume that $\lambda_1$ in $b_0$ alone is affected by a wavelength failure. To recover from such a failure using the spare bandwidth on $\lambda_4$, one may convert $\lambda_1$ to $\lambda_4$ at a node prior to the fault, but this requires both bands to be demultiplexed at this node. To avoid demultiplexing of the bands and preserve the wavelength grouping, a new technique called band-swapping which converts band $b_0$ to $b_1$ and $b_1$ to $b_0$ can be used to recover from the failure.

As another example, assume that $\lambda_0$ and $\lambda_1$ are used in $b_0$, so is $\lambda_5$ in $b_1$ as in FIG. 11(b). Further assume that band $b_0$ is affected by a band failure. Instead of having to re-route the traffic carried by band $b_0$ using a backup BS along a link-disjoint path, one may use a technique which we call band merging, whereby the traffic carried by wavelengths $\lambda_0$ and $\lambda_1$ can be restored on their corresponding wavelengths in $b_1$ (i.e., $\lambda_3$ and $\lambda_4$, respectively). Note that, the traffic carried on $\lambda_5$ should remain intact as a result of band merging as its corresponding wavelength $\lambda_2$ in $b_0$ is inactive. Also, while the band merging, technique can be implemented by simply converting $\lambda_0$ and $\lambda_1$ to $\lambda_3$ and $\lambda_4$, respectively, it may also be implemented by using a novel device operating under a principle similar to that of waveband conversion, which can avoid demultiplexing bands $b_0$ and $b_1$, as required by wavelength conversion. We research the feasibility and design of such a novel band-merging device that merges two bands into one that may or may not use the same band as one of the input bands.

Cost Models for Nodes and Networks

So far, existing work on WBS networks has focused on minimizing the port count only. Even in our preliminary research, we only considered the trade-off between the number of fibers/wavelengths and the number of MG-OXC ports. We build comprehensive and practical cost models and use them for the design and evaluation of WBS networks (as well as comparison between WBS networks and WRNs).

To begin with, we develop the following notations with respect to node architectures:

$C_{TX}$, $C_{RX}$, $C_{DXC}$: The cost of transmitters/receivers, and the DXC used for local add/drop ports;

$C_{WXC}$, $C_{BXC}$, $C_{FXC}$: The cost of an optical wavelength/band/fiber cross-connect, which is a function of their sizes (or port counts);

$C_{FTB}$, $C_{BTF}$: The cost of a fiber-to-band demultiplexer, or band-to-fiber multiplexer, which is a function of number of bands per fiber;

$C_{FTW}$, $C_{WTF}$: The cost of a fiber-to-wavelength demultiplexer, or wavelength-to-fiber multiplexer, which is a function of number of wavelengths per fiber;

$C_{BTW}$, $C_{WTB}$: The cost of a band-wavelength demultiplexer, or wavelength-to-band multiplexer, which is a function of number of wavelengths per band;

$C_{Wconv}$, $C_{Bconv}$: The cost of wavelength and waveband conversion banks;

Based on the above, we can develop a cost model for each MG-OXC architecture. For example, the cost of one single-layer MG-OXC shown in FIG. 2 may be calculated with the following formula:

$$C_{MG\text{-}OXC} = C_{FXC} + C_{BXC} + C_{WXC} + C_{FTB} + C_{BTW} + C_{WTB} + C_{BTF} + C_{TX} + C_{RX} + C_{DXC} + C_{Wconv} + C_{Bconv} \quad (23)$$

Clearly, the cost model of a multi-layer MG-OXC may be more (e.g., include additional FTB demultiplexers for interconnecting FXC and BXC layers). On the other hand, while the cost model of an ordinary-OXC will not include terms like $C_{FXC}$ and $C_{BXC}$, its actual cost may be more because of the much larger value (cost) of the term $C_{WXC}$.

With respect to a network, we should consider not only the cost of all nodes, but also the cost of wavelengths/fibers (including amplifiers), to be denoted by $C_{fiber}$. In order to simplify the cost model, we may lump the costs of FTB, FTW, or BTW into $C_{Demux}$, the cost of BTF, WTF, or WTB into $C_{mux}$, and the cost of FXC, BXC, and WXC into $C_{PXC}$, and use the following cost model for a WBS network.

$$C_{(Network)} = C_{Demux} + C_{Mux} + C_{PXC} + C_{TX} + C_{RX} + C_{DXC} + C_{Wconv} + C_{Bconv} + C_{fiber} \quad (24)$$

Note that the above models include all key components and thus are comprehensive.

Performance Evaluation with Static Traffic Pattern

TABLE 1

Results for a six-node network (F = 2, B = 2, W = 2)

|   |          | Optimal WBS |      |      | WBO-RWA |      |      | BPHT |      |      |
|---|----------|-------------|------|------|---------|------|------|------|------|------|
| 1 | $\Sigma t_p$ | 25      | 31   | 53   | 25      | 31   | 53   | 25   | 31   | 53   |
| 2 | OXC      | —           | —    | —    | 71      | 83   | 142  | —    | —    | —    |
| 3 | T(a)     | 0.48        | 0.42 | 0.51 | 1.23    | 0.84 | 1.26 | 0.54 | 0.43 | 0.56 |
| 4 | M(a)     | 0.69        | 0.50 | 0.73 | 1.44    | 1.19 | 1.50 | 0.63 | 0.50 | 0.69 |
| 5 | W(a)     | 1.02        | 1.02 | 1.01 | 1.00    | 1.00 | 1.00 | 1.00 | 1.02 | 1.02 |

Table 1 shows the total number of ports needed in a randomly generated six-node network, where the number of fiber pairs per link is F=2, the number of bands is B=2, and the number of wavelengths per band is W=2. We examined three random traffic patterns, wherein the total number of lightpaths established, denoted by $\Sigma t_p$ as Row 1, is 25, 31, and 53, respectively. As can be seen from Row 2 ("OXC") without using WBS, the total port count of ordinary OXCs in 71, 83, and 142, respectively.

Row 3 ("T(a)") shows the ratio of the total port count of MG-OXCs to that of the ordinary OXCs (where "a" stands for algorithm, which could either be optimal WBS, WBO-RWA or BPHT). As can be seen, T(a)<1 for both optimal WBS and BPHT under all three traffic patterns but not WBO-RWA in two cases, implying that using the former two algorithms reduces the port count, but using the third one may backfire.

Row 4 ("M(a)") shows the ratio of the port count of the largest MG-OXC to that of the largest OXC. Interestingly, M(WBO-RWA)>1, meaning that using WBO-RWA may create a "bottleneck" node. From these results, it is clear that BPHT can perform much better than WBO-RWA and in fact can achieve near-optimal results.

Row 5 ("W(a)") shows the ratio of the wavelength hops used by using a WBS algorithm to that used by an optimal RWA algorithm (i.e., without WBS). Obviously, W(WBO-RWA) has to be one definition. Interestingly, both optimal WBS and BPHT may result in a larger than 1 ratio W(a), meaning that they may use more wavelength-hops (WHs) than optimal RWA. In other words, there is a trade-off between the number of WHs used and the number of ports needed. This is reasonable because the objective of both optimal WBS and BPHT is not to minimize WHs. In fact, since their objective is to group as many lightpaths in a band as possible, they may choose a longer route to establish a lightpath, which results in a larger WHs.

Figure 12:
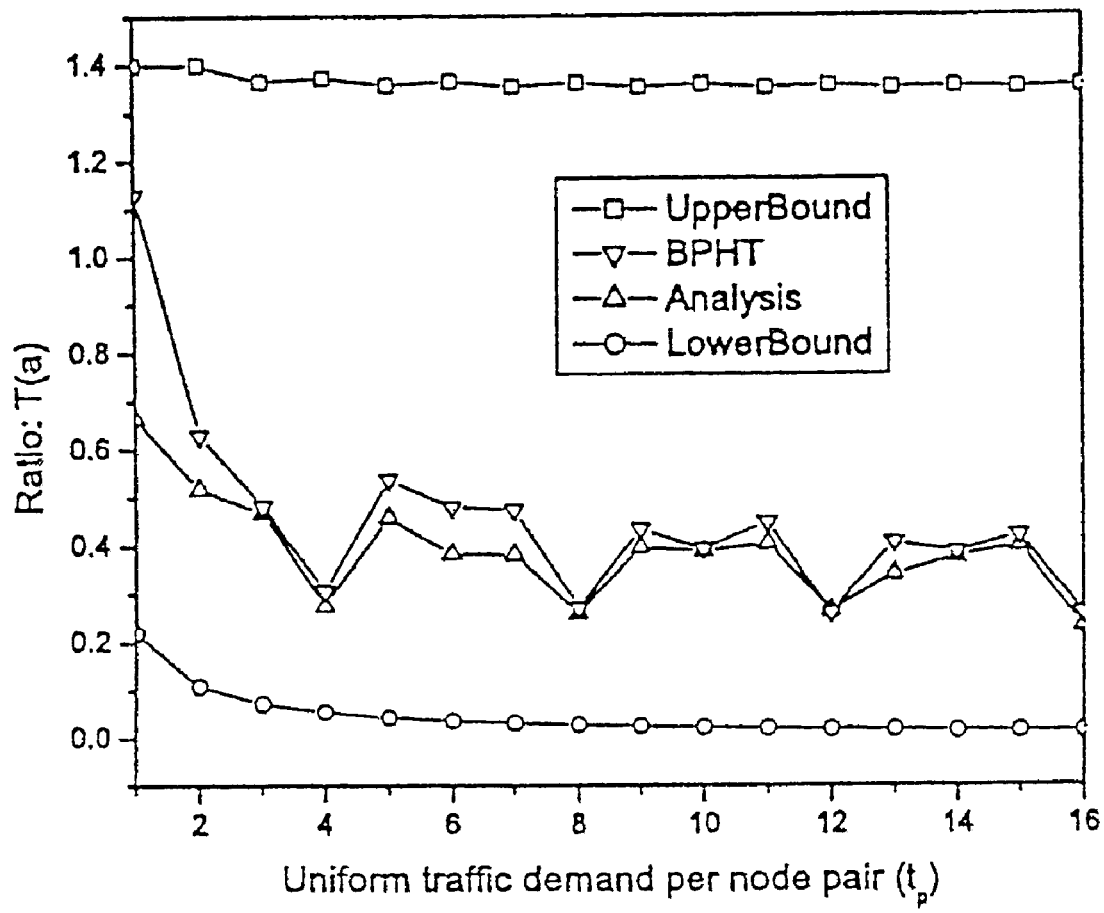
FIG. 12 illustrates T(a) for uniform traffic in NSF network.

FIG. 12 compares the improvement ratio T(a) obtained from our detailed analysis of BPHT with those from simulation of BPHT for the NSF network, where F=1, B=60, W=4, as a function of the uniform traffic intensity (i.e., the number of lightpaths per node pair). As can be seen, the analytic results are accurate, and match our simulation results, especially at the points where the traffic demand is a multiple of the waveband granularity W. Note the reason that T(BPHT) drops when the traffic intensity per node pair is a multiple of W=4 is that one can effectively assign wavelengths in the same band to lightpaths from the same source to the same destination in such case. From the upper bound analysis, we can also see that an inappropriate WBS algorithm may result in as much as 40% increase (instead of decrease) in the port count due to the overhead associated with MG-OXCs (in terms of multiplexer/demultiplexer ports for connecting different layers).

Figure 13:
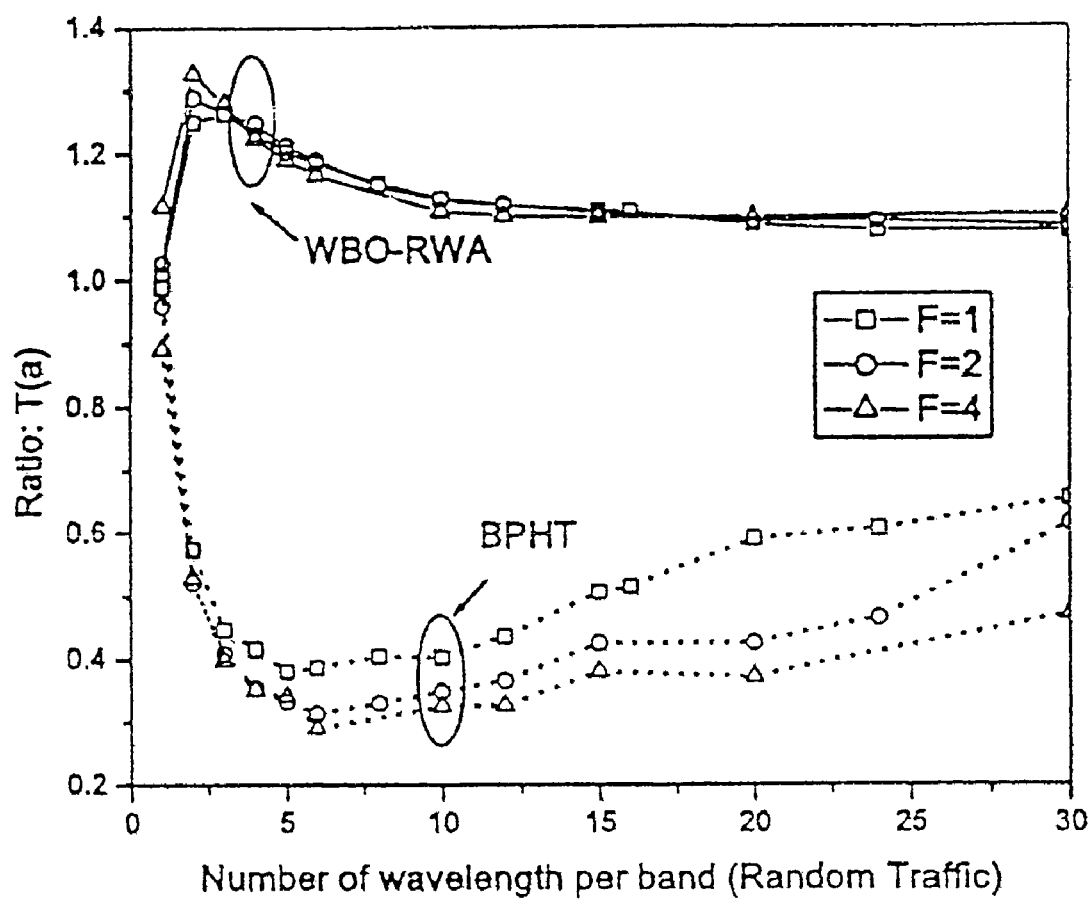
FIG. 13 illustrates T(a) for random traffic in the NSF network; and,
FIG. 14 illustrates blocking probability for incremental traffic.

FIG. 13 studies the impact of random (non-uniform) traffic. It also illustrates how the port count reduction ratio T(a) varies with W when the total number of wavelengths per link (which is F·K) is fixed at 240, i.e., F*B*W=240). For a fixed F (from 1 to 4), there seems to be an optimal value of W, which minimizes T(BPHT). The results also confirmed that T(WBO-RWA)>1, meaning that in this case, simply extending RWA to WBS networks may indeed backfire. Also from the figure, when the total number of wavelengths per link is fixed, a larger F results in a smaller T(BPHT) (thus a more significant reduction in the port count) but a larger T(WBO-RWA), implying that, on one hand, it is critical to use an intelligent WBS algorithm in a multi-fiber network, and on the other hand, WBS can be even more beneficial in multi-fiber networks.

Performance Evaluation with Incremental Traffic Pattern

Figure 14:
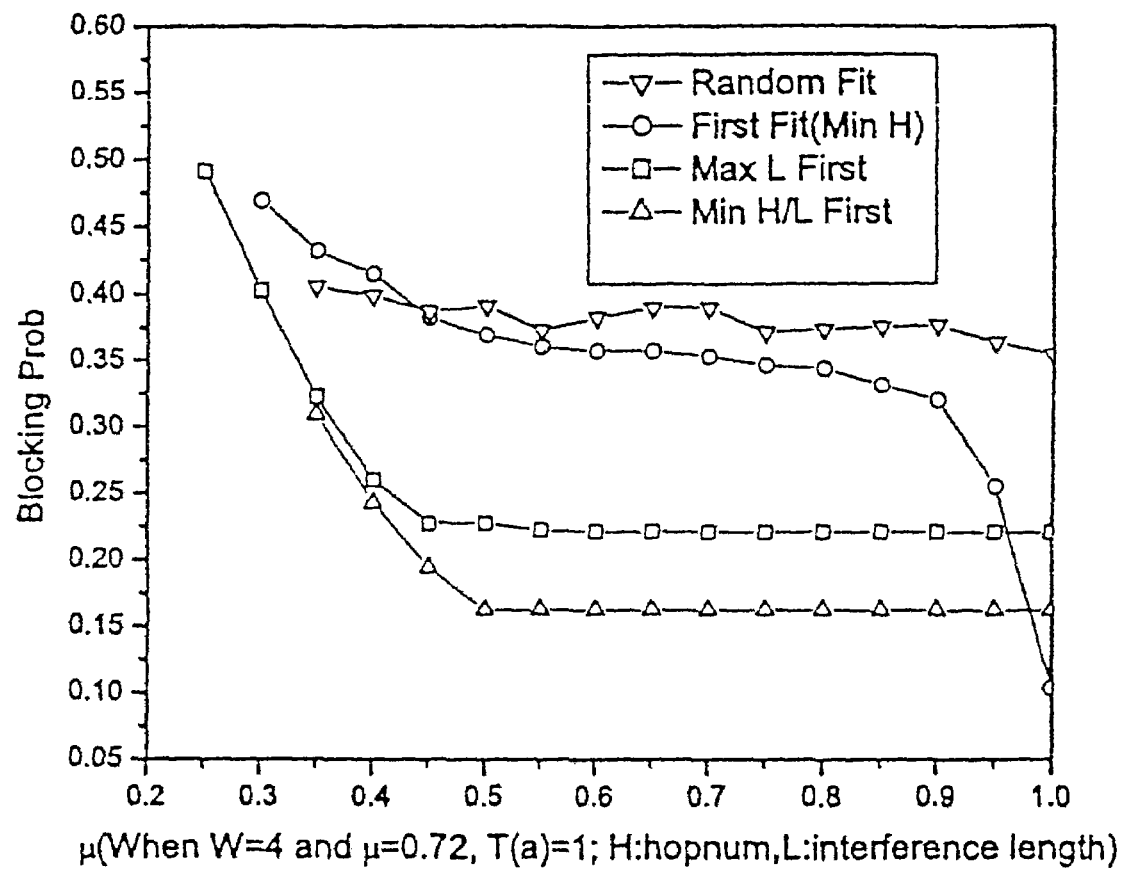

FIG. 14 shows how the blocking probability changes with $\mu$. We compared the results (blocking) of heuristic MIWRA for different weight parameters, we find that using "Min H/L First" reduced the blocking probability the maximum, when compared to "Max L First" and Random and First Fit (i.e., min H) heuristics. As described previously, increasing $\mu$ means increasing the number of ports at the MG-OXCs. However, our results of heuristic MIWRA shows when $\mu$ is big enough (e.g., 0.5), increasing $\mu$ further does not help at all in reducing the blocking probability. Specifically, for heuristic "Min H/L first", $\mu=0.5$ is enough. After that, an even larger value of $\mu$ (i.e., ports) does not help reduce the blocking probability.

As mentioned previously, to achieve bandwidth efficiency and at the same time, minimize the port count in WBS networks is very challenging. All existing approaches settle for some kind of trade-offs if not totally neglect to achieve bandwidth efficiency. Further, the design of a MG-OXC architecture, algorithms for utilizing wavelength/waveband conversion, and algorithms for protection/restoration in WBS networks are not intuitive and have not been considered.

Thus, it is seen that the objects of the invention are efficiently obtained, although modifications and changes to the invention should be readily apparent to those having ordinary skill in the art, and these changes and modifications are intended to be within the scope of the claims.

What is claimed is:

1. A method of optimizing signal traffic in a multi-layer waveband switching (WBS) optical network with a multi-granular optical cross-connect (MG-OXC), comprising:

for a node in said network, constraining a first lightpath to a single port, thereby reducing a number of active ports required in said MG-OXC to handle an amount of traffic as compared with a number of active ports required by a combination of ordinary cross-connects to handle said amount of traffic.

2. The method of optimizing signal traffic as recited in claim 1 wherein said node further comprises a wavelength cross-connect (WXC) port, a waveband cross-connect (BXC) port, and a fiber cross-connect (FXC) port and said first lightpath is a bypass lightpath; and, said method further comprising:

switching said bypass lightpath using said single port selected from the group including said WXC port, said BXC port, and said FXC port.

3. The method of optimizing signal traffic as recited in claim 2 wherein said node further comprises a wavelength add port, a waveband add port, and a fiber add port and said first lightpath is an add lightpath; and, said method further comprising:

adding said add lightpath using said single port selected from the group including said wavelength add port, said waveband add port, and said fiber add port.

4. The method of optimizing signal traffic as recited in claim 3 wherein said node further comprises a wavelength drop port, a waveband drop port, and a fiber drop port and said first lightpath is a drop lightpath; and, said method further comprising:

dropping said drop lightpath using said single port selected from the group including said wavelength drop port, said waveband drop port, and said fiber drop port.

5. The method of optimizing signal traffic as recited in claim 4 wherein said optical network further comprises: first and second wavelengths and first and second wavebands; wherein said node further comprises a WXC layer, a BXC layer, a FXC layer, a wavelength to waveband (WTB) multiplexer, a waveband to fiber (BTF) multiplexer, a waveband to wavelength (BTW) demultiplexer, and a fiber to waveband (FTB) demultiplexer; and, said method further comprising:

constraining said first wavelength to pass from said WXC layer through said first WTB multiplexer to said BXC layer;

constraining said first waveband to pass from said BXC layer through said first BTF multiplexer to said FXC layer constraining said second wavelength to pass from said BXC layer through said first BTW demultiplexer to said WXC layer; and, constraining said second waveband to pass from said FXC layer through said first FTB demultiplexer to said BXC layer.

6. The method of optimizing signal traffic as recited in claim 5 wherein said network further comprises:

a first number of input ports in said WXC layer, wherein each said first number of input ports receives a lightpath from an at least one second node; and, a second number of input ports in said WXC layer, wherein each said second number of input ports locally adds at least one lightpath; and, said method further comprising:

constraining a minimum number of required input ports in said WXC layer equal to a sum of said first and second numbers.

7. The method of optimizing signal traffic as recited in claim 6 further comprising:

operating upon a first number of wavebands in said BXC layer, wherein said operating is selected from the group including cross-connecting, adding, dropping, and bypassing;

wherein said network further comprises:

a second number of wavebands demultiplexed from said FXC layer to said BXC layer; and, a third number of wavebands with wavelengths multiplexed from said WXC layer to said BXC layer; and, said method further comprising:

constraining a minimum number of required input ports in said BXC layer equal to a sum of said first, second, and third numbers.

8. The method of optimizing signal traffic as recited in claim 7 further comprising:

operating upon a first number of fibers in said FXC layer, wherein said operating is selected from the group including cross-connecting, adding, dropping, and bypassing;

wherein said network further comprises:

a second number of fibers demultiplexed from said FXC layer to said BXC layer; and, a third number of fibers with wavebands multiplexed from said BXC layer to said FXC layer; and, said method further comprising constraining a minimum number of required input ports in said FXC layer equal to a sum of said first, second, and third numbers.

9. The method of optimizing signal traffic as recited in claim 8 wherein said node further comprises a number of available WTB multiplexers and a number of available BTW demulitiplexers; and, said method further comprising:

activating a number of WTB multiplexers no greater than said number of available WTB multiplexers and activating a number of BTW demultiplexers no greater than said number of available BTW demultiplexers.

10. The method of optimizing signal traffic as recited in claim 1 wherein said network further comprises a third waveband and a fiber; and, said method further comprising:

constraining said third waveband to said BXC port; and, constraining said fiber to said FXC port.

11. The method of optimizing signal traffic as recited in claim 10 wherein said network further comprises at least one first node pair, respective traffic for each node pair in said at least one first node pair, at least one bypass lightpath, and at least one lightpath overlapping at least one other lightpath; and, said method further comprising:

determining balanced path routing for said respective traffic; and, assigning wavelengths for said respective traffic according to a sequence comprising said at least one bypass lightpath followed by said one lightpath overlapping at least one other lightpath.

12. The method of optimizing signal traffic as recited in claim 11 wherein said network further comprises at least one lightpath in said FXC layer, and at least one lightpath in said BXC layer; and, said method further comprising:

switching in sequence, first said at least one lightpath in said FXC layer at said FXC layer and then said at least one lightpath in said BXC layer at said BXC layer.

13. The method of optimizing signal traffic as recited in claim 12 wherein said network further comprises a plurality of links and wherein determining balanced path routing further comprises:

finding K-shortest routes for each pair in said at least one first node pair and ordering said K-shortest routes from shortest to longest;

determining a maximum link load over all links in said plurality of links; and, selecting a route for a pair in said at least one first node pair having a lowest maximum link load.

14. The method of optimizing signal traffic as recited in claim 13 wherein each node in said at least one first node pair further comprises at least one fiber with at least one band, and wherein assigning respective wavelengths further comprises:

determining at least one set of node pairs from said at least one first node pair;

calculating a weight for each said at least one set of node pairs;

selecting a set of node pairs from said at least one set of node pairs having a largest weight;

grouping wavelengths assigned to each said respective traffic in a respective fiber from said at least one fiber and in a respective band from said at least one band; and, constraining consecutive node pairs in said at least one first node pair from sharing a band from said at least one band.

15. The method of optimizing signal traffic as recited in claim 1 wherein said network further comprises at least one second node pair and respective traffic for each node pair in said at least one second node pair; and, said method further comprising:

determining routing for said respective traffic with respect to K-shortest paths for each node pair in said at least one second node pair; and, assigning wavebands to said respective traffic according to band number restrictions, port number restrictions, and a respective weight for said each node pair.

16. The method of optimizing signal traffic as recited in claim 15 wherein said determining routing further comprises determining K-shortest paths for said each node pair in said at least one second node pair, determining a respective interference length for each said K-shortest paths, and selecting a path from said K-shortest paths having a largest interference length.

17. The method of optimizing signal traffic as recited in claim 16 wherein said respective weight further comprises a quantity selected from the group including: a respective hop number for said each node pair, an inverse of said respective interference length, and the product of said respective hop number and said inverse of said respective interference length.

18. The method of optimizing signal traffic as recited in claim 17 wherein assigning wavebands to said respective traffic according a respective weight for said each node pair further comprises selecting a minimum respective weight able to satisfy said respective traffic.

19. A method for enhancing survivability in a waveband switching (WBS) optical network, comprising the steps of:

selecting at least one back-up band-segment, wherein said at least one back-up band-segment is connected to first and second nodes; and, switching traffic on at least one band-segment to said back-up band-segment, wherein said at least one band-segment is connected to said first and second nodes and is link-disjoint with respect to said at least one back-up band-segment.

20. The method recited in claim 19 wherein said at least one band-segment further comprises a first number of wavebands and said at least one back-up band-segment further comprises a second number of back-up band-segments, wherein said second number is at least equal to said first number; and, wherein said switching further comprises switching traffic on each said first number of wavebands to a respective back-up band-segment in said second number of back-up band-segments.

21. The method recited in claim 19 wherein said switching further comprises switching respective traffic on each said at least one band-segment to a single back-up band-segment from said at least one back-up band-segment at a respective time, wherein each said respective time is different than remaining said respective times.

22. The method recited in claim 19 wherein said at least one band-segment comprises a first number of link-joint band-segments and said at least one back-up band-segment further comprises a second number of link-joint back-up band-segments, wherein said second number is at least equal to said first number; and, wherein said switching further comprises switching traffic on each said at least one band-segment to a respective said at least one back-up band-segment at a respective time, wherein each said respective time is different than remaining said respective times.

23. A method for enhancing survivability in a waveband switching (WBS) optical network, the method comprising: switching traffic between first and second wavebands in a fiber.

24. The method recited in claim 23 wherein said switching further comprises switching traffic on said first waveband to said second waveband.

25. The method recited in claim 23 wherein said switching further comprises switching traffic on said first waveband to said second waveband and switching traffic on said second waveband to said first waveband.

26. The method recited in claim 23 wherein said second waveband is free of traffic; and, wherein said switching further comprises switching in response to a failure of said first waveband.

27. A multi-granular optical cross-connect (MG-OXC) switch comprising:

a waveband conversion element;

a wavelength conversion element; and, a sub-wavelength element operatively arranged to add and drop sub-wavelength traffic.

28. The MG-OXC switch recited in claim 27 further comprising:

a fiber cross-connect (FXC), a waveband cross-connect (BXC), and a wavelength cross-connect (WXC); and, a fiber to waveband (FIB) demultiplexer, a waveband to wavelength (BTW) demultiplexer, a wavelength to waveband (WTB) multiplexer, and a waveband to fiber (BTF) multiplexer; and, wherein said waveband conversion element further comprises a waveband conversion bank, said wavelength conversion element further comprises a wavelength conversion bank, and said sub-wavelength element further comprises a transmit/receive (TX/RX) block and a digital cross-connect (DXC) electronics element.

29. The MG-OXC switch recited in claim 28 wherein said MG-OXC switch is a multiple-layer MG-OXC switch.

30. The MG-OXC switch recited in claim 28 wherein said MG-OXC switch is a single layer MG-OXC switch.

31. An apparatus for optimizing signal traffic in a multi-layer waveband switching (WBS) optical network with a multi-granular optical cross-connect (MG-OXC), comprising:
for a node in said network, means for constraining a first lightpath to a single port, thereby reducing a number of active ports required in said MG-OXC to handle an amount of traffic as compared with a number of active ports required by a combination of ordinary cross-connects to handle said amount of traffic.

32. The apparatus of claim 31 wherein said node further comprises a wavelength cross-connect (WXC) port, a waveband cross-connect (BXC) port, and a fiber cross-connect (FXC) port and said first lightpath is a bypass lightpath; and, said apparatus further comprising:
means for switching said bypass lightpath using said single port selected from the group including said WXC port, said BXC port, and said FXC port.

33. The apparatus of claim 32 wherein said node further comprises a wavelength add port, a waveband add port, and a fiber add port and said first lightpath is an add lightpath; and,
said apparatus further comprising:
means for adding said add lightpath using said single port selected from the group including said wavelength add port, said waveband add port, and said fiber add port.

34. The apparatus of claim 33 wherein said node further comprises a wavelength drop port, a waveband drop port, and a fiber drop port and said first lightpath is a drop lightpath; and,
said apparatus further comprising:
means for dropping said drop lightpath using said single port selected from the group including said wavelength drop port, said waveband drop port, and said fiber drop port.

35. The apparatus of claim 34 wherein said optical network further comprises: first and second wavelengths and first and second wavebands;
wherein said node further comprises a WXC layer, a BXC layer, a FXC layer, a wavelength to waveband (WTB) multiplexer, a waveband to fiber (BTF) multiplexer, a waveband to wavelength (BTW) demultiplexer, and a fiber to waveband (FTB) demultiplexer; and,
said apparatus further comprising:
means for constraining said first wavelength to pass from said WXC layer through said first WTB multiplexer to said BXC layer;
means for constraining said first waveband to pass from said BXC layer through said first BTF multiplexer to said FXC layer
means for constraining said second wavelength to pass from said BXC layer through said first BTW demultiplexer to said WXC layer; and,
means for constraining said second waveband to pass from said FXC layer through said first FTB demultiplexer to said BXC layer.

36. The apparatus of claim 35 wherein said network further comprises:
at least one first input port in said WXC layer, wherein each input port in said at least one first input port receives at least one lightpath from at least one second node and said at least one first input port comprises a first number of input ports; and,
at least one second input port in said WXC layer, wherein each input port in said at least one second input port locally adds at least one lightpath and said at least one second input port comprises a second number of input ports; and,
said apparatus further comprising:
means for constraining a minimum number of required input ports in said WXC layer equal to a sum of said first and second numbers.

37. The apparatus of claim 36 further comprising:
means for operating upon a first number of wavebands in said BXC layer, wherein said operating is selected from the group including cross-connecting, adding, dropping, and bypassing;
wherein said network further comprises:
a second number of wavebands demultiplexed from said FXC layer to said BXC layer; and,
a third number of wavebands with wavelengths multiplexed from said WXC layer to said BXC layer; and,
said apparatus further comprising:
means for constraining a minimum number of required input ports in said BXC layer equal to a sum of said first, second, and third numbers.

38. The apparatus of claim 37 further comprising:
means for operating upon a first number of fibers in said FXC layer, wherein said operating is selected from the group including cross-connecting, adding, dropping, and bypassing;
wherein said network further comprises:
a second number of fibers demultiplexed from said FXC layer to said BXC layer; and,
a third number of fibers with wavebands multiplexed from said BXC layer to said FXC layer; and,
said apparatus further comprising:
means for constraining a minimum number of required input ports in said FXC layer equal to a sum of said first, second, and third numbers.

39. The apparatus of claim 38 wherein said node further comprises a number of available WTB multiplexers and a number of available BTW demulitiplexers; and,
said apparatus further comprising:
means for activating a number of WTB multiplexers no greater than said number of available WTB multiplexers and activating a number of BTW demultiplexers no greater than said number of available BTW demultiplexers.

40. The apparatus of claim 31 wherein said network further comprises a third waveband and a fiber; and,
said apparatus further comprising:
means for constraining said third waveband to said BXC port; and,
means for constraining said fiber to said FXC port.

41. The apparatus of claim 40 wherein said network further comprises at least one first node pair, respective traffic for each node pair in said at least one first node pair, at least one bypass lightpath, and at least one lightpath overlapping at least one other lightpath; and,
said apparatus further comprising:
means for determining balanced path routing for said respective traffic; and,
means for assigning wavelengths for said respective traffic according to a sequence comprising said at least one bypass lightpath followed by said one lightpath overlapping at least one other lightpath.

42. The apparatus of claim 41 wherein said network further comprises at least one lightpath in said FXC layer, and at least one lightpath in said BXC layer; and, said apparatus further comprising:
    means for switching in sequence, first said at least one lightpath in said FXC layer at said FXC layer and then said at least one lightpath in said BXC layer at said BXC layer.

43. The apparatus of claim 42 wherein said network further comprises a plurality of links and wherein said means foe determining balanced path routing further comprises:
    means for finding K-shortest routes for each pair in said at least one first node pair and ordering said K-shortest routes from shortest to longest;
    means for determining a maximum link load over all links in said plurality of links; and,
    means for selecting a route for a pair in said at least one first node pair having a lowest maximum link load.

44. The apparatus of claim 43 wherein each node in said at least one first node pair further comprises at least one fiber with at least one band, and wherein said means for assigning respective wavelengths further comprises:
    means for determining at least one set of node pairs from said at least one first node pair;
    means for calculating a weight for each said at least one set of node pairs;
    means for selecting a set of node pairs from said at least one set of node pairs having a largest weight;
    means for grouping wavelengths assigned to each said respective traffic in a respective fiber from said at least one fiber and in a respective band from said at least one band; and,
    means for constraining consecutive node pairs in said at least one first node pair from sharing a band from said at least one band.

45. The apparatus of claim 31 wherein said network further comprises at least one second node pair and respective traffic for each node pair in said at least one second node pair; and,
said apparatus further comprising:
    means for determining routing for said respective traffic with respect to K-shortest paths for each node pair in said at least one second node pair; and,
    means for assigning wavebands to said respective traffic according to band number restrictions, port number restrictions, and a respective weight for said each node pair.

46. The apparatus of claim 45 wherein said means for determining routing further comprises means for determining K-shortest paths for said each node pair in said at least one second node pair, means for determining a respective interference length for each said K-shortest paths, and means for selecting a path from said K-shortest paths having a largest interference length.

47. The apparatus of claim 46 wherein said respective weight further comprises a quantity selected from the group including: a respective hop number for said each node pair, an inverse of said respective interference length, and the product of said respective hop number and said inverse of said respective interference length.

48. The apparatus of claim 47 wherein said means for assigning wavebands to said respective traffic according a respective weight for said each node pair further comprises means for selecting a minimum respective weight able to satisfy said respective traffic.

49. An apparatus for enhancing survivability in a waveband switching (WBS) optical network, comprising:
    means for selecting at least one back-up band-segment, wherein said at least one back-up band-segment is connected to first and second nodes; and,
    means for switching traffic on at least one band-segment to said back-up band-segment, wherein said at least one band-segment is connected to said first and second nodes and is link-disjoint with respect to said at least one back-up band-segment.

50. The apparatus of claim 49 wherein said at least one band-segment further comprises a first number of wavebands and said at least one back-up band-segment further comprises a second number of back-up band-segments, wherein said second number is at least equal to said first number; and,
wherein said means for switching further comprises means for witching traffic on each said first number of wavebands to a respective back-up band-segment in said second number of back-up band-segments.

51. The apparatus of claim 49 wherein said means for switching further comprises means for switching respective traffic on each said at least one band-segment to a single back-up band-segment from said at least one back-up band-segment at a respective time, wherein each said respective time is different than remaining said respective times.

52. The apparatus of claim 49 wherein said at least one band-segment comprises a first number of link-joint band-segments and said at least one back-up band-segment further comprises a second number of link-joint back-up band-segments, wherein said second number is at least equal to said first number; and,
wherein said means for switching further comprises means for switching traffic on each said at least one band-segment to a respective said at least one back-up band-segment at a respective time, wherein each said respective time is different than remaining said respective times.

53. An apparatus for enhancing survivability in a waveband switching (WBS) optical network, comprising:
    means for switching traffic between first and second wavebands in a fiber.

54. The apparatus of claim 53 wherein said means for switching further comprises means for switching traffic on said first waveband to said second waveband.

55. The apparatus of claim 53 wherein said means for switching further comprises means for switching traffic on said first waveband to said second waveband and switching traffic on said second waveband to said first waveband.

56. The apparatus of claim 53 wherein said second waveband is free of traffic; and,
    wherein said means for switching further comprises means for switching in response to a failure of said first waveband.

\* \* \* \* \*

UNITED STATES PATENT AND TRADEMARK OFFICE
CERTIFICATE OF CORRECTION

| | |
|---|---|
| PATENT NO. | : 7,162,632 B2 |
| APPLICATION NO. | : 10/665535 |
| DATED | : March 2, 2007 |
| INVENTOR(S) | : Cao et al. |

It is certified that error appears in the above-identified patent and that said Letters Patent is hereby corrected as shown below:

Col. 22, lines 46 - 51; should read
10. The method of optimizing signal traffic as recited in claim 9 wherein said network further comprises a third waveband and a fiber; and,
said method further comprising:
    constraining said third waveband to said BXC port; and,
    constraining said fiber to said FXC port.

Col. 26, lines 56 - 55; should read
40.   The apparatus of claim 39 wherein said network further comprises a third waveband and a fiber; and,
said apparatus further comprising:
    means for constraining said third waveband to said BXC
        port; and,
    means for constraining said fiber to said FXC port.

Signed and Sealed this

Twenty-sixth Day of June, 2007

JON W. DUDAS
*Director of the United States Patent and Trademark Office*

UNITED STATES PATENT AND TRADEMARK OFFICE
CERTIFICATE OF CORRECTION

PATENT NO.         : 7,162,632 B2
APPLICATION NO. : 10/665535
DATED                  : January 9, 2007
INVENTOR(S)        : Cao et al.

It is certified that error appears in the above-identified patent and that said Letters Patent is hereby corrected as shown below:

Col. 22, lines 46 - 51; should read
10. The method of optimizing signal traffic as recited in claim 9 wherein said network further comprises a third waveband and a fiber; and,
said method further comprising:
    constraining said third waveband to said BXC port; and,
    constraining said fiber to said FXC port.

Col. 26, lines 56 - 55; should read
40.   The apparatus of claim 39 wherein said network further comprises a third waveband and a fiber; and,
said apparatus further comprising:
    means for constraining said third waveband to said BXC
        port; and,
    means for constraining said fiber to said FXC port.

This certificate supersedes Certificate of Correction issued June 26, 2007.

Signed and Sealed this

Twenty-fourth Day of July, 2007

JON W. DUDAS
*Director of the United States Patent and Trademark Office*